(12) United States Patent  
Beaumont

(10) Patent No.: US 9,374,978 B2  
(45) Date of Patent: Jun. 28, 2016

(54) SYSTEM AND METHOD FOR TRANSPORTING SAND

(71) Applicant: Sandmiser Inc., Mitchell (CA)

(72) Inventor: James Beaumont, Mitchell (CA)

(73) Assignee: Sandmiser Inc., Mitchell, Ontario (CA)

( * ) Notice: Subject to any disclaimer, the term of this patent is extended or adjusted under 35 U.S.C. 154(b) by 0 days.

(21) Appl. No.: 14/427,318

(22) PCT Filed: Sep. 17, 2013

(86) PCT No.: PCT/CA2013/000784  
§ 371 (c)(1),  
(2) Date: Mar. 11, 2015

(87) PCT Pub. No.: WO2014/040174  
PCT Pub. Date: Mar. 20, 2014

(65) Prior Publication Data  
US 2015/0223428 A1    Aug. 13, 2015

Related U.S. Application Data

(60) Provisional application No. 61/701,750, filed on Sep. 17, 2012.

(51) Int. Cl.  
*A01K 1/01* (2006.01)  
*A01K 1/015* (2006.01)  
*B65G 37/00* (2006.01)

(52) U.S. Cl.  
CPC .............. *A01K 1/015* (2013.01); *A01K 1/0135* (2013.01); *B65G 37/00* (2013.01); *Y10T 29/4984* (2015.01)

(58) Field of Classification Search  
CPC .............................. A01K 1/014; A01K 1/0135  
See application file for complete search history.

(56) References Cited

U.S. PATENT DOCUMENTS 1,177,695 A * 4/1916 Gable ................. A01K 1/0128  
119/451  
1,735,585 A * 11/1929 Rivinius ............. A01K 1/0135  
198/607

(Continued)

FOREIGN PATENT DOCUMENTS

DE        19519088 C1    9/1996  
EP         0749684 A1    12/1996

(Continued)

OTHER PUBLICATIONS

International Search Report dated Jul. 28, 2015 for International Application No. PCT/CA2015/000259, filed on Apr. 17, 2015.

(Continued)

*Primary Examiner* — Thomas Randazzo

(57) ABSTRACT

A conveyor system for transporting sand that is moved outwardly, from a lower end of an enclosure region in at least one animal stall toward a gutter, to a discharge location. The conveyor system includes a conveyor assembly having a transportation element for moving the sand, a drive subassembly for moving the transportation element on a predetermined path, and one or more guide subassemblies, for guiding the transportation element. The conveyor system also includes one or more support assemblies for at least partially defining a slot in the preselected region in which a part of the transportation element is receivable, for receiving at least a portion of the sand, and one or more grates located at least partially above the part of the transportation element positioned in the preselected region, through which the portion of the sand is permitted to pass.

22 Claims, 32 Drawing Sheets

(56) References Cited

U.S. PATENT DOCUMENTS

| | | | | |
|---|---|---|---|---|
| 1,791,381 | A | * | 2/1931 | Rogers ................. A01K 1/0135 198/497 |
| 2,263,504 | A | * | 11/1941 | Krueger ............... A01K 1/0128 119/451 |
| 2,516,798 | A | * | 7/1950 | Peterson .............. A01K 1/0128 119/450 |
| 2,790,537 | A | * | 4/1957 | Howe ................... A01K 1/0132 198/601 |
| 2,951,582 | A | * | 9/1960 | Petraske .............. A01K 1/0146 198/745 |
| 3,105,590 | A | | 10/1963 | Polley |
| 3,113,663 | A | * | 12/1963 | Kitson ................. A01K 1/0146 172/26.5 |
| 3,815,433 | A | | 6/1974 | Klotzbach |
| 5,289,912 | A | * | 3/1994 | Faulstich ............... B65G 25/04 119/447 |
| 5,662,068 | A | * | 9/1997 | Childs ................. A01K 1/0135 119/451 |
| 5,758,600 | A | * | 6/1998 | Jyh ....................... A01K 31/04 119/161 |
| 6,131,727 | A | | 10/2000 | Nelson |
| 7,047,905 | B1 | * | 5/2006 | Brade ..................... A01K 1/01 119/442 |
| 7,614,365 | B2 | * | 11/2009 | Kuhlmann ........... A01K 1/0135 119/164 |
| 7,827,938 | B2 | | 11/2010 | Kuehlmann |
| 7,918,330 | B2 | | 4/2011 | Bertolini |
| 2001/0015177 | A1 | | 8/2001 | Fujii |
| 2004/0084064 | A1 | | 5/2004 | Verderosa et al. |
| 2008/0105212 | A1 | | 5/2008 | Kuehlmann |
| 2008/0149036 | A1 | | 6/2008 | Emery |
| 2009/0008223 | A1 | | 1/2009 | Fujii |

FOREIGN PATENT DOCUMENTS

| | | |
|---|---|---|
| NL | 1002289 C2 | 8/1997 |
| WO | WO02094011 A1 | 11/2002 |
| WO | WO2014040174 A1 | 3/2014 |

OTHER PUBLICATIONS

Machine-generated English translation of WO02094011.
International Search Report dated Nov. 28, 2013 for International Application No. PCT/CA2013/000784, published as WO 2014/040174, filed on Sep. 17, 2013.
Machine-generated English translation of the Abstract of NL 1002289.
Machine-generated English translation of DE 19519088.

* cited by examiner

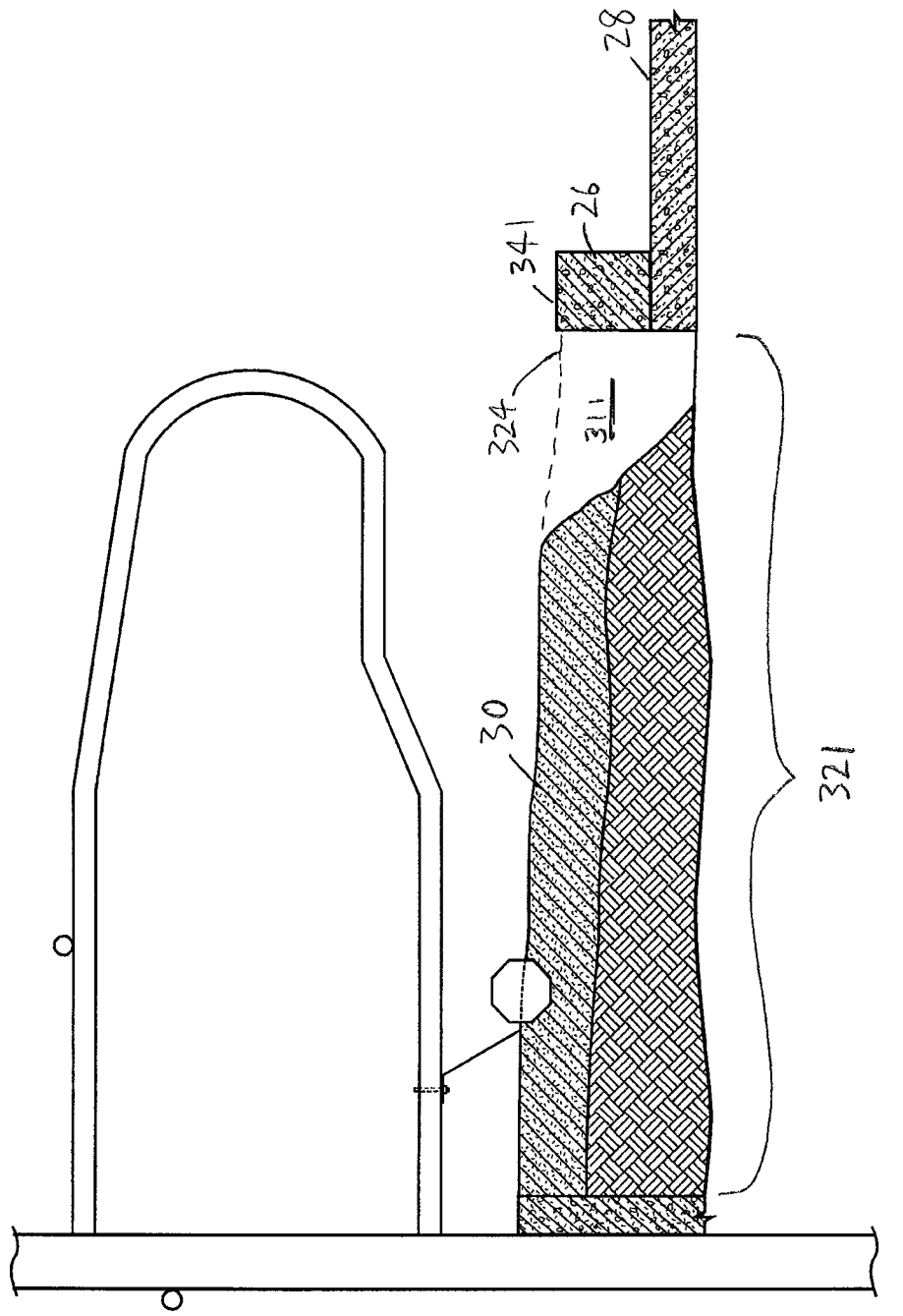

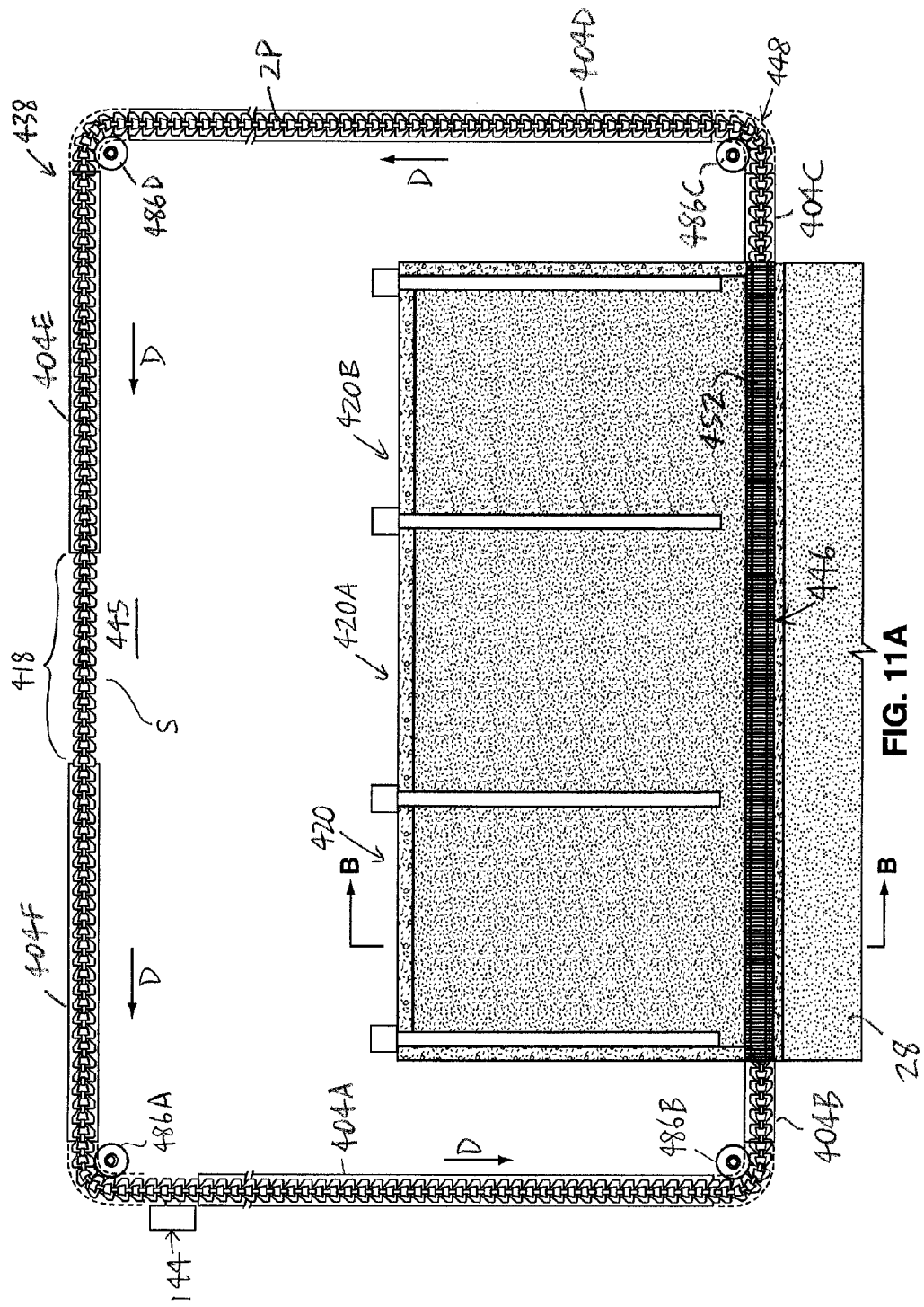

```
                                                    ╱767

┌─────────────────────────────────────┐
│  providing a conveyor assembly,     │
│  including a transportation         │
│  element and a drive                │── 769
│  subassembly for moving the         │
│  transportation element along a     │
│  predetermined path                 │
└─────────────────────────────────────┘
                  │
┌─────────────────────────────────────┐
│  providing at least one support     │
│  assembly at least partially        │
│  defining a channel in which a      │── 771
│  part of the transportation         │
│  element is receivable              │
└─────────────────────────────────────┘
                  │
┌─────────────────────────────────────┐
│  providing at least one grate       │
│  located on the support assembly    │
│  adapted to permit a portion of     │── 773
│  sand therethrough onto the part    │
│  of the transportation element      │
└─────────────────────────────────────┘
                  │
┌─────────────────────────────────────┐
│  energizing the drive subassembly,  │
│  to move the transportation         │── 775
│  element along the predetermined    │
│  path                               │
└─────────────────────────────────────┘
                  │
┌─────────────────────────────────────┐
│  discharging the portion of the     │
│  sand positioned on loaded links    │
│  of the transportation element at   │── 777
│  a discharge location               │
└─────────────────────────────────────┘
```

FIG. 12

I # SYSTEM AND METHOD FOR TRANSPORTING SAND

This application is a U.S. National Phase Application of International Patent Application No. PCT/CA2013/000784, filed on Sep. 17, 2013, which claims priority to U.S. Provisional Patent Application No. 61/701,750, filed on Sep. 17, 2012, both of which are hereby incorporated by reference in their entirety.

FIELD OF THE INVENTION

The present invention is a conveyor system and method for transporting sand.

BACKGROUND OF THE INVENTION

In modern stalls for dairy cattle, different bedding materials are used, with different degrees of success. Each of the various bedding materials has its own advantages and disadvantages. As is well known in the art, sand has been found to be an acceptable bedding material, and is capable of providing superior results in terms of cow hygiene and comfort.

A cross-section of a typical stall 20 of the prior art is illustrated in FIG. 1A. A top view of three typical stalls is provided in FIG. 1B. (As will be described, the balance of the drawings illustrate the present invention.) The stall 20 typically includes an enclosure region 21 extending between upper and lower ends 22, 24.

The typical stall 20 includes a curb 26 positioned on a floor 28 of the barn. Because of the curb 26, sand 30 in the stall 20 is held above the floor 28. As can be seen in FIG. 1A, the sand 30 is typically underlain by a base 32 of suitable material. The stall 20 typically also includes an upper wall 33 and a post 34 which supports a divider element 36, for marking a lateral boundary of the stall 20. As can be seen in FIG. 1B, the stall 20 typically also includes another divider element 37 defining the other side of the stall 28.

From the foregoing, it can be seen that the sand 30 is located in the enclosure region 21 for the stall 20. The enclosure region 21 is located between the upper wall 33 and the curb 26.

In FIG. 1B, two additional prior art stalls are illustrated, identified as 20A and 20B for convenience. Those skilled in the art would appreciate that, in practice, any number of stalls may be located together in one or more rows.

Those skilled in the art would also appreciate that the stall 20 is designed so that, when a cow "A" is lying in the stall 20, a back end "B" of the cow's body is located proximal to the lower end 24, and a front end "C" of the cow's body is located proximal to the upper end 22. The typical stall is not wide enough to permit the cow to turn around in the stall. Accordingly, for the cow to exit the stall, the cow must stand up and back out of the stall.

It can be seen from FIGS. 1A and 1B that, when the cow "A" is in the stall, the back end "B" of the cow is positioned generally in the vicinity of the curb 26, and may be somewhat outside the stall (i.e., beyond the curb 26), e.g., when the cow is standing in the stall. It is intended that, because of this positioning, urine and feces from the cow falls onto the floor (or gutter) 28, i.e., outside the stall 20. The prior art stall is designed with its size and layout in order to generally avoid contamination of the sand in the prior art stall by manure, although such contamination sometimes does occur, to a limited extent.

However, one disadvantage of the typical prior art stall is that, in practice, a substantial amount of sand is moved out of the stall and onto the floor 28, i.e., in the directions indicated by arrows "X" and "Y" in FIG. 1A. Such outward movement of the sand is due to the movement of the cow, as the cow exits the stall. This is generally due to a tendency to shuffle, i.e., the cow drags its hooves over the sand, as the cow backs out of the stall. In this way, each cow moves some sand out of the prior art stall and onto the floor every time it exits the prior art stall.

It has been determined that a surprisingly large amount of sand is removed from the prior art stalls in this way. It is estimated that approximately 45-50 pounds (approximately 20.4-22.7 kg.) of sand is required to be replaced in the typical prior art stall once every day.

For the reasons set out above, the floor 28 typically has manure on it. Accordingly, when sand is moved out of the stall and onto the floor 28 as described above, the sand is mixed with the manure, to provide a sand-manure mixture.

This has serious, and costly, consequences, because of the relatively large amounts of sand that are mixed with the manure. As is well known in the art, the manure on the floor is required to be removed regularly, and then processed. Any sand that has become mixed in the manure on the floor is removed with it. Once removed, the sand-manure mixture usually is processed in accordance with typical practices, e.g., the mixture of sand and manure is ultimately spread on fields. However, because of the relatively large amounts of sand involved, the mixture of the sand in the manure typically has significant negative impacts. First, the sand adds significant weight to the material to be processed. Because of the amount of sand which may be mixed into the manure (e.g., in a large barn), the additional weight can be significant. Second, because the sand is abrasive, it causes the processing machinery to wear out more quickly. Finally, the sand lost from the stalls has to be replaced, adding significantly to operating costs.

One solution that has been proposed is to process the sand-manure mixture to remove the sand therefrom, and to clean the sand. However, this adds significant capital costs, because a special machine is needed for removing the sand and cleaning it. Also, the steps of removing and cleaning the sand adds significantly to the operational costs incurred in processing the sand-manure mixture on an ongoing basis. Additional costs are also incurred in connection with moving the cleaned sand back into the stalls.

SUMMARY OF THE INVENTION

For the foregoing reasons, there is a need for a system that overcomes or mitigates one or more of the deficiencies of the prior art.

In its broad aspect, the invention provides a conveyor system for transporting sand that is moved outwardly, from a lower end of an enclosure region in at least one animal stall toward a gutter, to a discharge location. The conveyor system includes a conveyor assembly having a transportation element for moving the sand, a drive subassembly for moving the transportation element on a predetermined path between a preselected region that is located between the lower end and the gutter, and the discharge location, and one or more guide subassemblies, for guiding the transportation element along one or more portions of the predetermined path when the transportation element is moved by the drive subassembly. The conveyor system also includes one or more support assemblies for at least partially defining a slot in the preselected region in which a part of the transportation element is receivable, for receiving at least a portion of the sand moved outwardly from the lower end of the enclosure region. In addition, the conveyor system includes one or more grates located at least partially above the part of the transportation element positioned in the preselected region by the support assembly. The grate is adapted to permit the portion of the sand moved outwardly from the lower end of the enclosure region to pass through the grate onto the part of the transportation element thereunder, for movement of the portion thereby to the discharge location, where the portion of the sand is dischargable from the transportation element at the discharge location.

In another of its aspects, the invention provides a conveyor system for transporting sand that is moved outwardly, from a lower end of an enclosure region in at least one animal stall toward a gutter, to an upper end of the enclosure region. The conveyor system includes a conveyor assembly having a transportation element for moving the sand, a drive subassembly for moving the transportation element on a predetermined path between a preselected region that is located between the lower end and the gutter, and the upper end, and one or more guide subassemblies, for guiding the transportation element along one or more portions of the predetermined path when the transportation element is moved by the drive subassembly. The conveyor system also includes one or more support assemblies for at least partially defining a slot in the preselected region in which a part of the transportation element is receivable, for receiving at least a portion of the sand moved outwardly from the lower end of the enclosure region. In addition, the conveyor system includes one or more grates located at least partially above the part of the transportation element positioned in the preselected region by the support assembly. The grate is adapted to permit the portion of the sand moved outwardly from the lower end of the enclosure region to pass through the grate onto the part of the transportation element thereunder, for movement of the portion thereby to the upper end, where the portion of the sand is dischargable from the transportation element. The conveyor system also includes an upper housing positioned proximal to the upper end of the enclosure region, in which a segment of the transportation element is receivable and from which the portion of the sand is discharged.

In another of its aspects, the invention provides a stall system for one or more animals located proximal to a gutter. The stall system includes an enclosure region extending between an upper end and a lower end thereof, the upper end being elevated above the lower end, and sand located in the enclosure region on which said at least one animal is positionable. The stall system also includes a conveyor assembly for moving a portion of the sand that is moved outwardly, from the lower end toward the gutter, to a discharge location. The conveyor assembly includes a transportation element for moving the sand, a drive subassembly for moving the transportation element on a predetermined path between a preselected region that is located between the lower end and the gutter, and the discharge location, and one or more guide subassemblies, for guiding the transportation element along one or more portions of the predetermined path when the transportation element is moved by the drive subassembly. The stall system also includes one or more support assemblies for at least partially defining a slot in the preselected region in which a part of the transportation element is receivable for receiving at least a portion of the sand moved outwardly from the lower end of the enclosure region, and a grate located at least partially above the part of the transportation element positioned in the preselected region by the support assembly. The grate is adapted to permit the portion of the sand moved outwardly from the lower end of the enclosure region to pass through the grate onto the part of the transportation element thereunder, for movement of the portion thereby to the discharge location, where the portion of the sand is dischargable from the transportation element at the discharge location.

In yet another aspect, the invention provides a kit of parts for a conveyor system for transporting sand that is moved outwardly, from a lower end of an enclosure region in at least one animal stall toward a gutter, to a discharge location. The animal stall includes a monolithic curb element located proximal to the lower end. The kit includes a conveyor assembly having a transportation element for moving the sand, a drive subassembly for moving the transportation element on a predetermined path between a preselected region that is located between the lower end and the gutter, and the discharge location, and one or more guide subassemblies, for guiding the transportation element along one or more portions of the predetermined path when the transportation element is moved by the drive subassembly. The kit also includes one or more support assemblies for at least partially defining a slot in the preselected region in which a part of the transportation element is receivable, for receiving at least a portion of the sand moved outwardly from the lower end of the enclosure region. In addition, the kit includes one or more grates to be located at least partially above the part of the transportation element positioned in the preselected region by the support assembly. The grate is adapted to permit the portion of the sand moved outwardly from the lower end of the enclosure region to pass through the grate onto the part of the transportation element thereunder, for movement of the portion thereby to the discharge location, where the portion of the sand is dischargable from the transportation element. The support assembly includes one or more brackets mountable on one or more exterior surfaces of a monolithic curb element proximal to the lower end of the enclosure region, the bracket defining the slot. The support assembly also includes one or more support bodies securable to the bracket and positioned in the slot, for at least partially defining the channel in which the part of the transportation element is receivable and located thereby in the preselected region.

BRIEF DESCRIPTION OF THE DRAWINGS

The invention will be better understood with reference to the attached drawings, in which:

FIG. 6A is a partial cross-section of a stall of the prior art from which an amount of sand has been removed, at a lower end of the enclosure region thereof, drawn at a smaller scale;

FIG. 11A is a top view of another alternative embodiment of the conveyor system of the invention, drawn at a smaller scale;

FIG. 12 is a flow chart schematically illustrating an embodiment of a method of the invention.

DETAILED DESCRIPTION

Figure 1A:
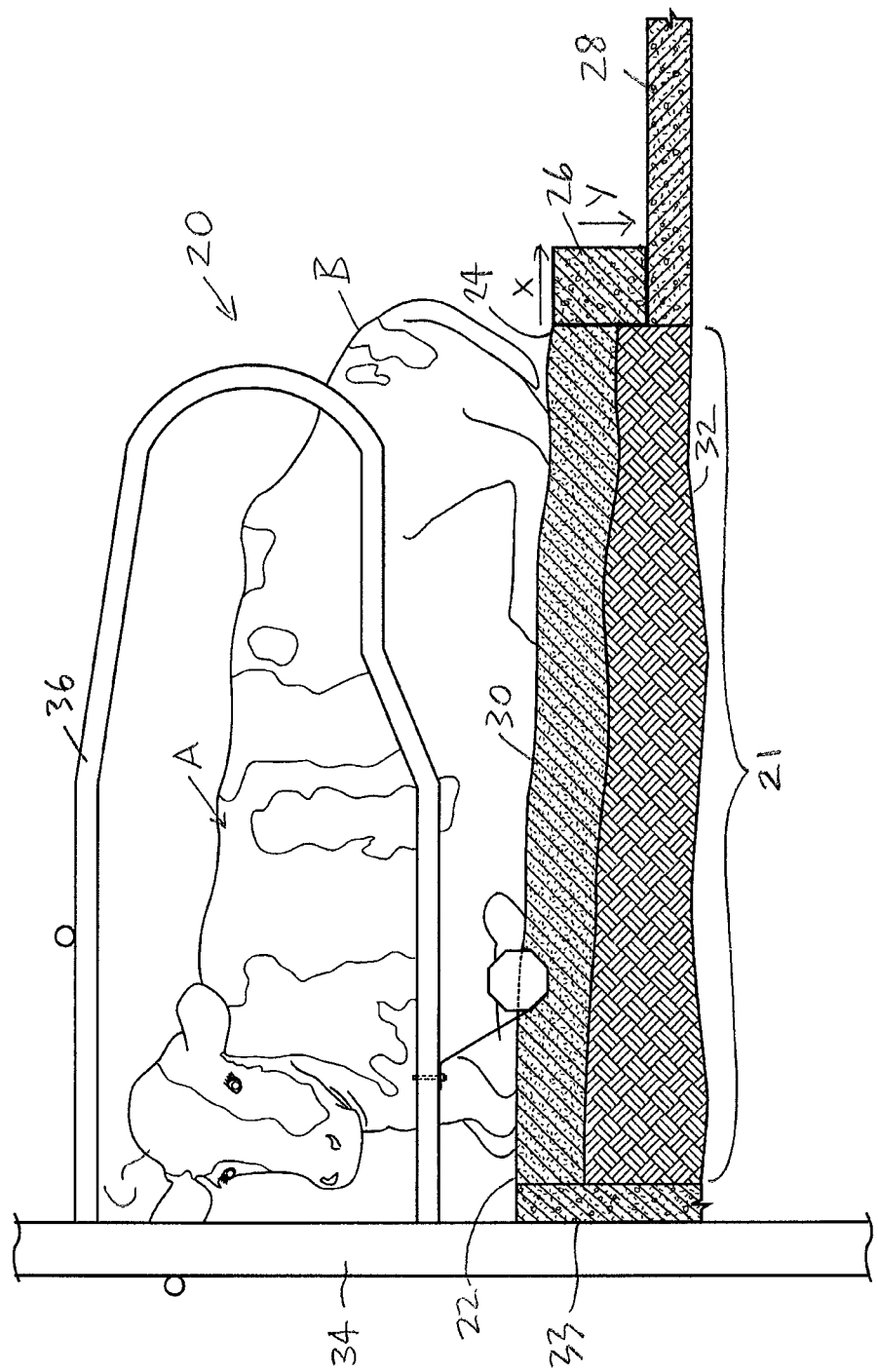
FIG. 1A (also described previously) is a partial cross-section of a stall of the prior art.
Figure 1B:
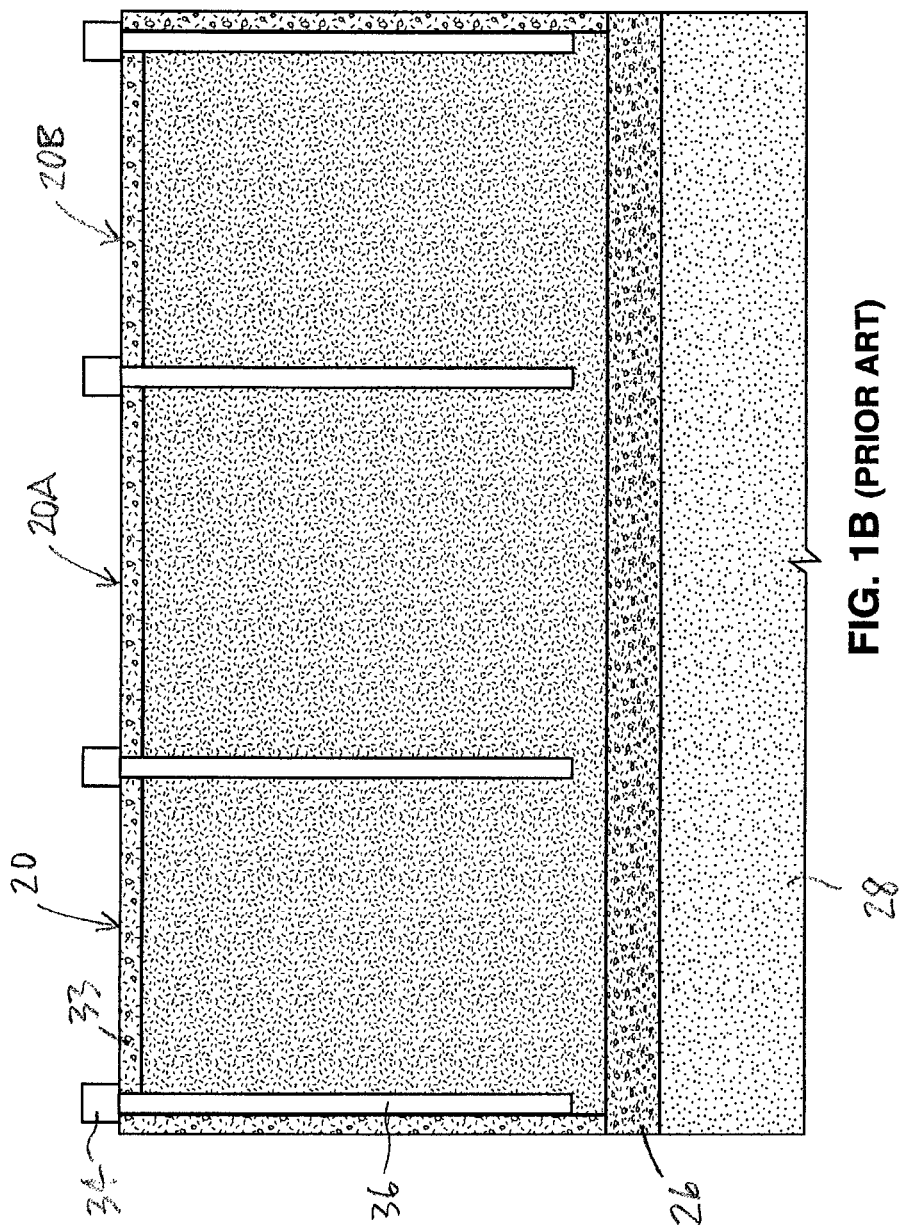
FIG. 1B (also described previously) is a top view of three typical stalls of the prior art, drawn at a smaller scale.
Figure 2:
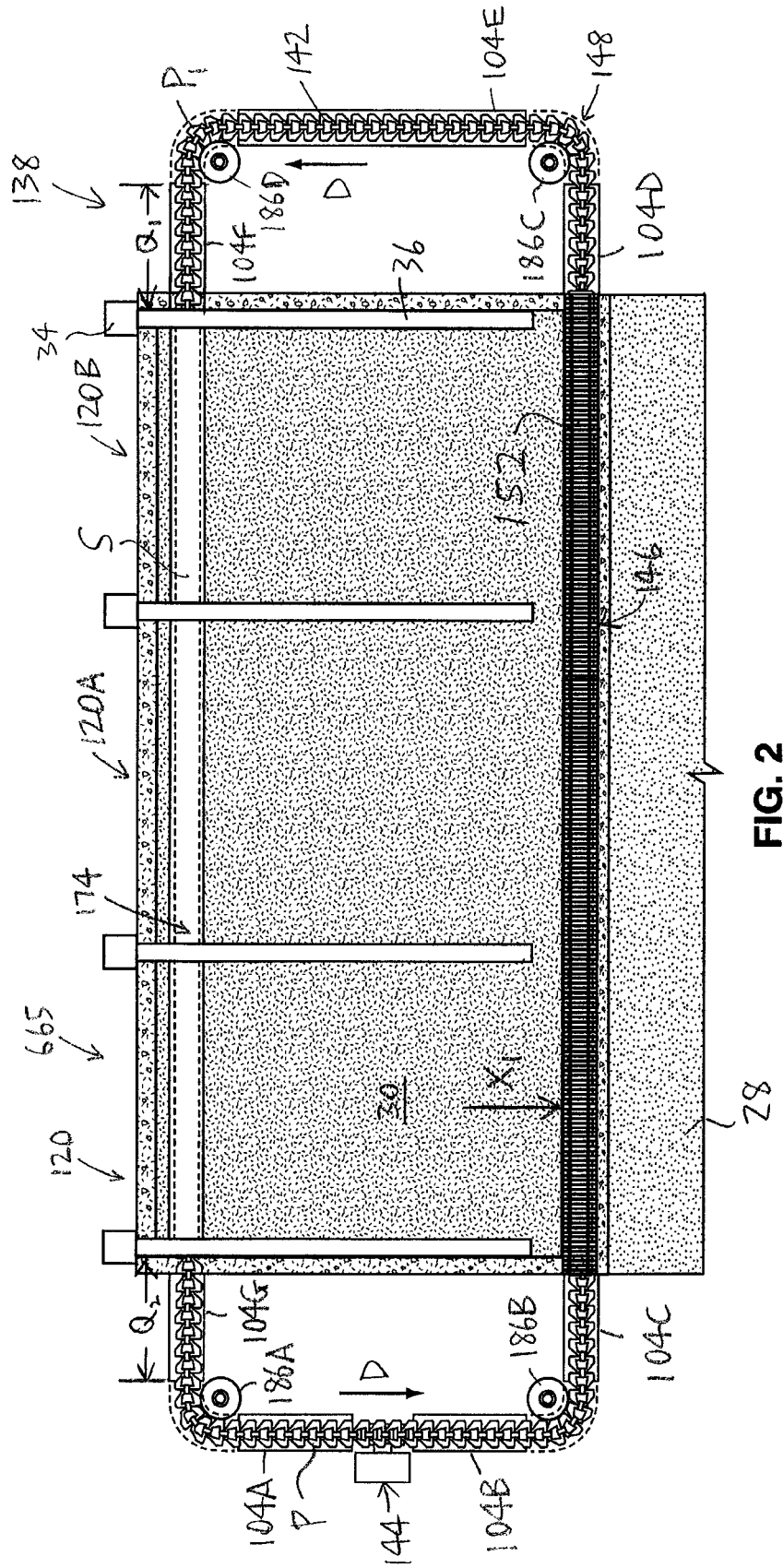
FIG. 2 is a top view of an embodiment of a conveyor system of the invention.

In the attached drawings, like reference numerals designate corresponding elements throughout. Reference is first made to FIGS. 2-4 and FIGS. 7A-9D to describe an embodiment of a conveyor system in accordance with the invention indicated generally by the numeral 138. As will be described, the conveyor system 138 preferably is for transporting sand 30 that is moved outwardly, from a lower end 124 of an enclosure region 121 in one or more animal stalls 120 toward the gutter 28, to a discharge location "S". In one embodiment, the conveyor system 138 preferably includes a conveyor assembly 140 (FIG. 2). It is preferred that the conveyor assembly 140 includes a transportation element 142 for moving the sand 30, and a drive subassembly 144 for moving the transportation element 142 on a predetermined path "P" between a preselected region 146 that is located between the lower end 124 and the gutter 28, and the discharge location "S" (FIG. 2). Preferably, the conveyor assembly 140 also includes one or more guide subassemblies 148 (FIG. 9B), for guiding the transportation element 142 along one or more portions "$P_1$" of the predetermined path "P" when the transportation element 142 is moved by the drive subassembly 144. In one embodiment, the conveyor system 138 preferably also includes one or more support assemblies 150 for at least partially defining a slot "T" in the preselected region 146 in which a part 151 of the transportation element 142 is receivable, for receiving at least a portion 154 of the sand 30 moved outwardly from the lower end 124 of the enclosure region 121 (FIG. 3B). It is also preferred that the conveyor system 138 includes one or more grates 152 located at least partially above the part 151 of the transportation element 142 positioned in the preselected region 121 by the support assembly 150 (FIG. 3B). The grate 152 preferably is adapted to permit at least a portion 154 of the sand 30 moved outwardly from the lower end 124 of the enclosure region 121 to pass through the grate 152 onto the part 151 of the transportation element 142 thereunder, for movement of the portion 154 thereby to the discharge location, where the portion 154 of the sand 30 is dischargable from the transportation element 142 at the discharge location.

Figure 7A:
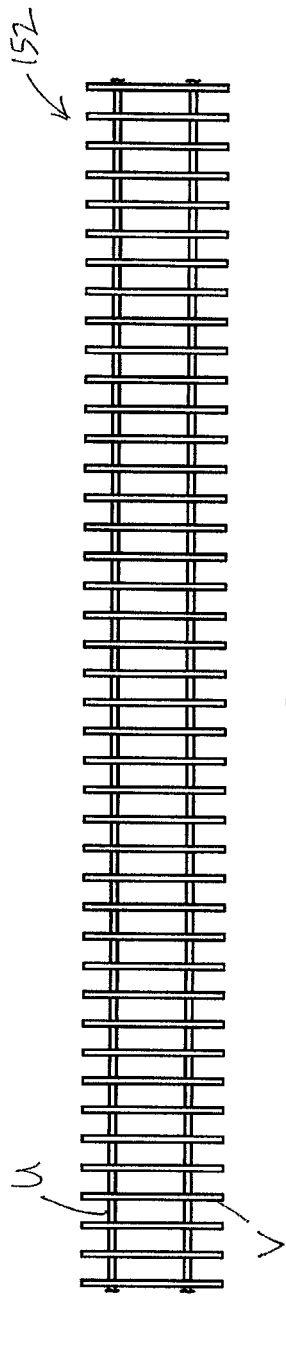
FIG. 7A is a top view of an embodiment of a grate of the invention, drawn at a smaller scale.
Figure 7B:
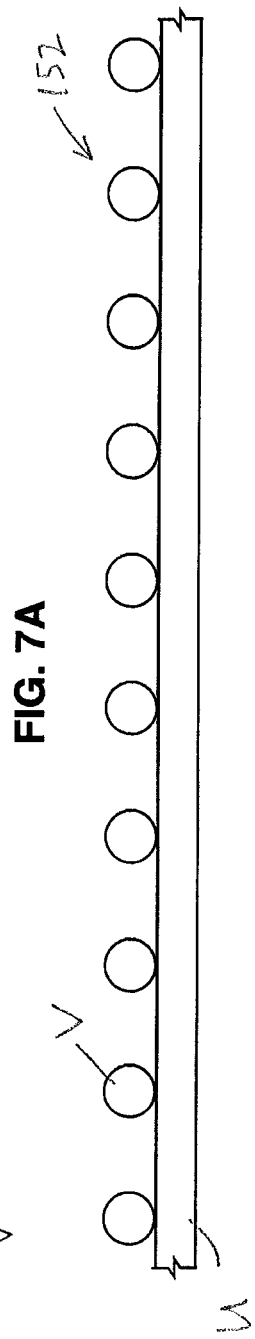
FIG. 7B is a side view of the grate of FIG. 4A, drawn at a larger scale.
Figure 7D:
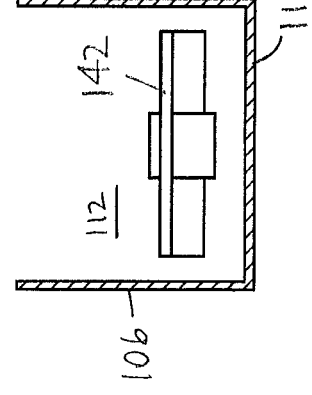
FIG. 7D is a cross-section of another embodiment of the trough element of the invention.
Figure 7C:
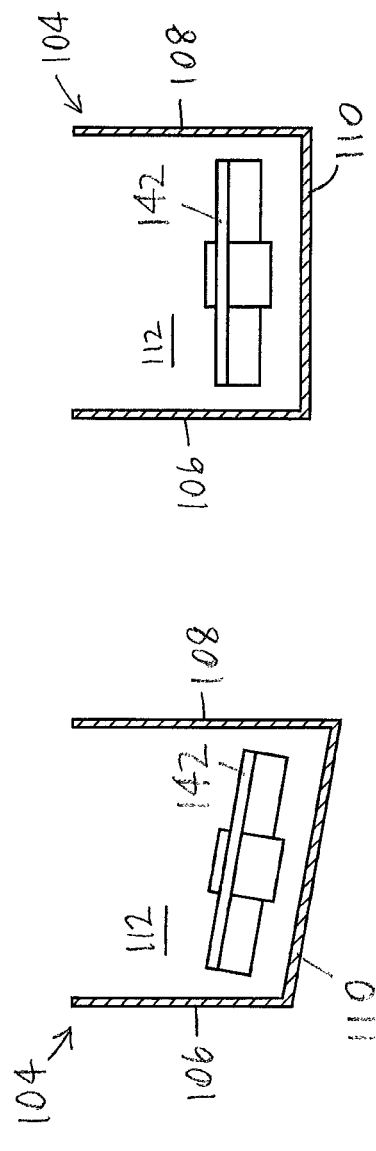
FIG. 7C is a cross-section of an embodiment of a trough element of the invention, drawn at a larger scale.
Figure 9A:
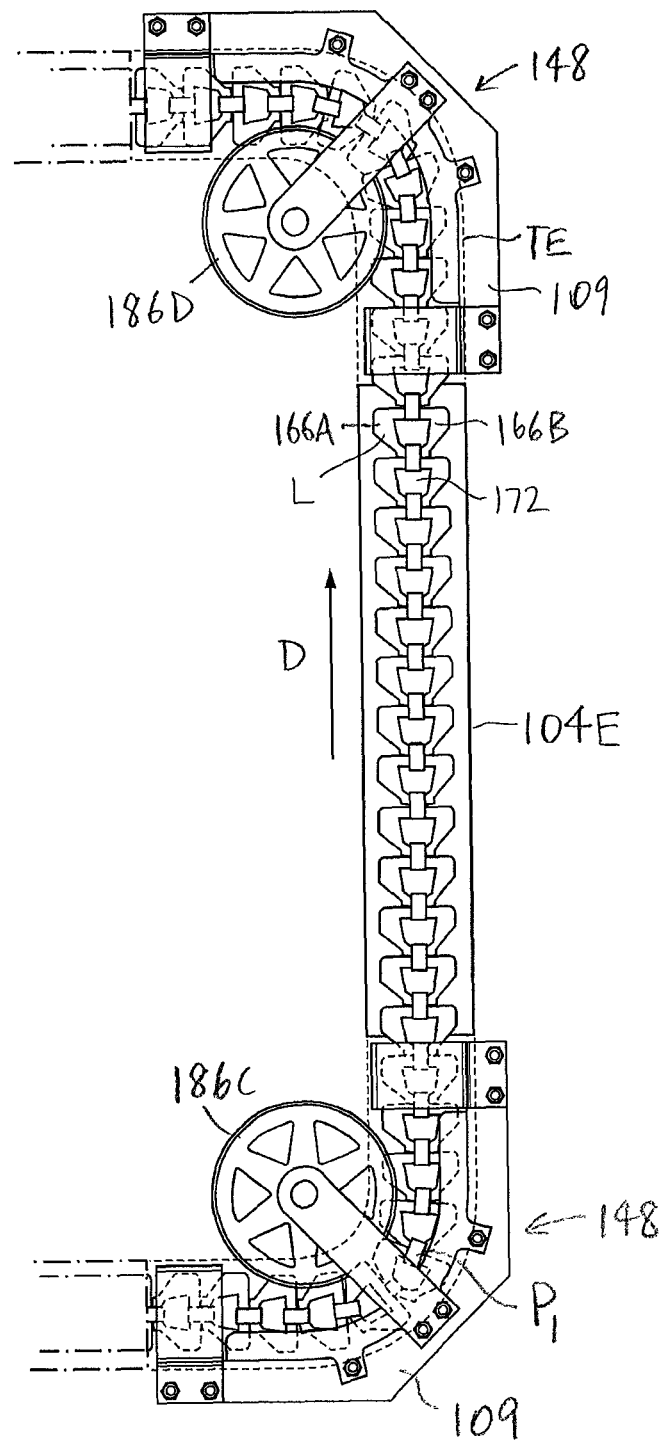
FIG. 9A is a top view of a portion of an embodiment of the guide subassembly of the invention with a portion of the transportation element mounted therein, drawn at a smaller scale.

It will be understood that only certain parts of the guide assemblies 148 are included in FIG. 2, for clarity of illustration. Also, and as will be described, it is preferred that the conveyor system 138 includes one or more trough elements 104 located on the predetermined path "P" (FIGS. 2, 9A). Portions of the transportation element 142 preferably are positioned in the trough elements 104 (FIGS. 7C, 7D). Each trough element 104 preferably includes walls 106, 108 joined by a floor 110 (FIGS. 7C, 7D).

Figure 3A:
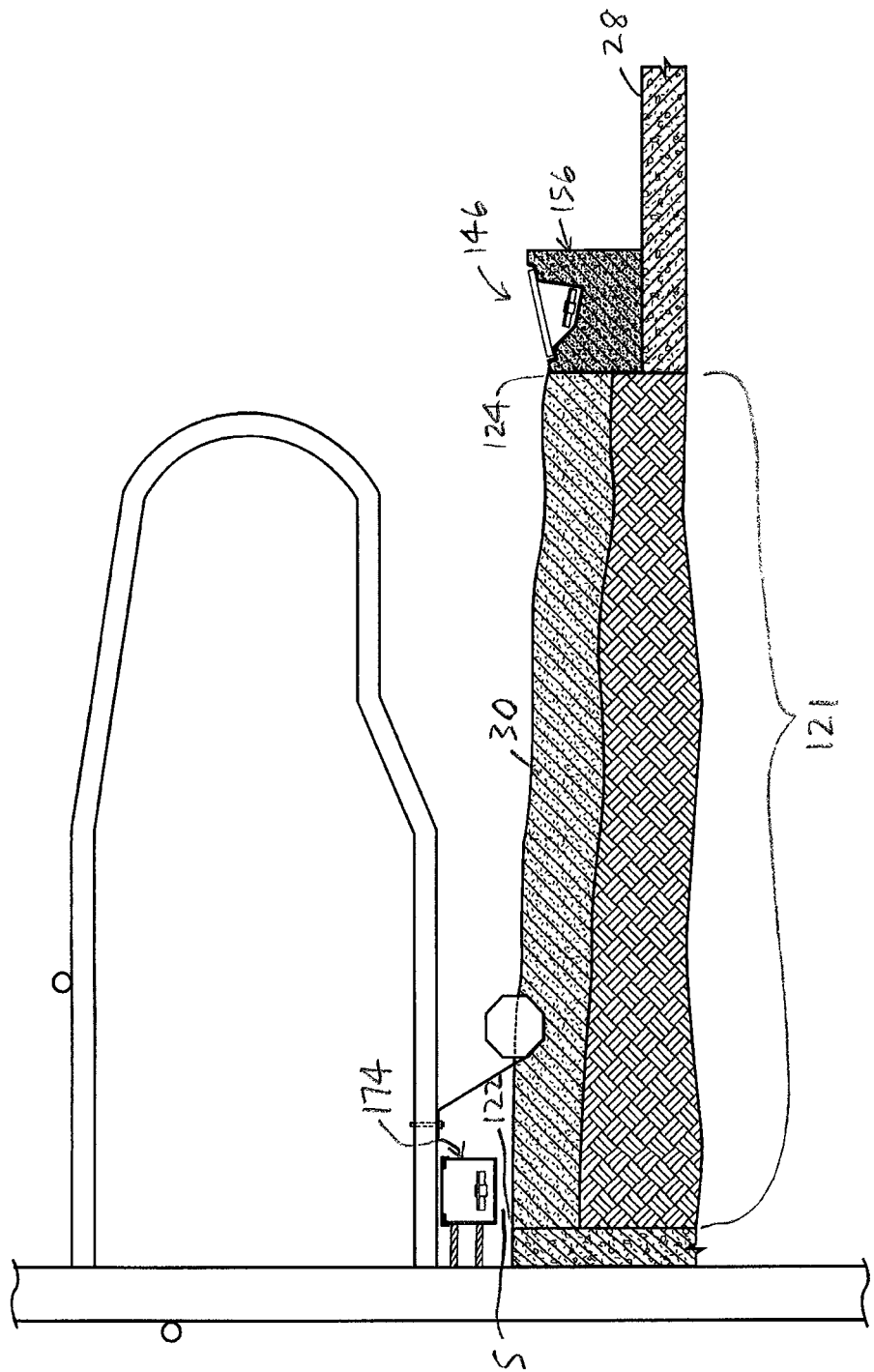
FIG. 3A is a partial cross-section of an embodiment of a stall of the invention, drawn at a larger scale.
Figure 3B:
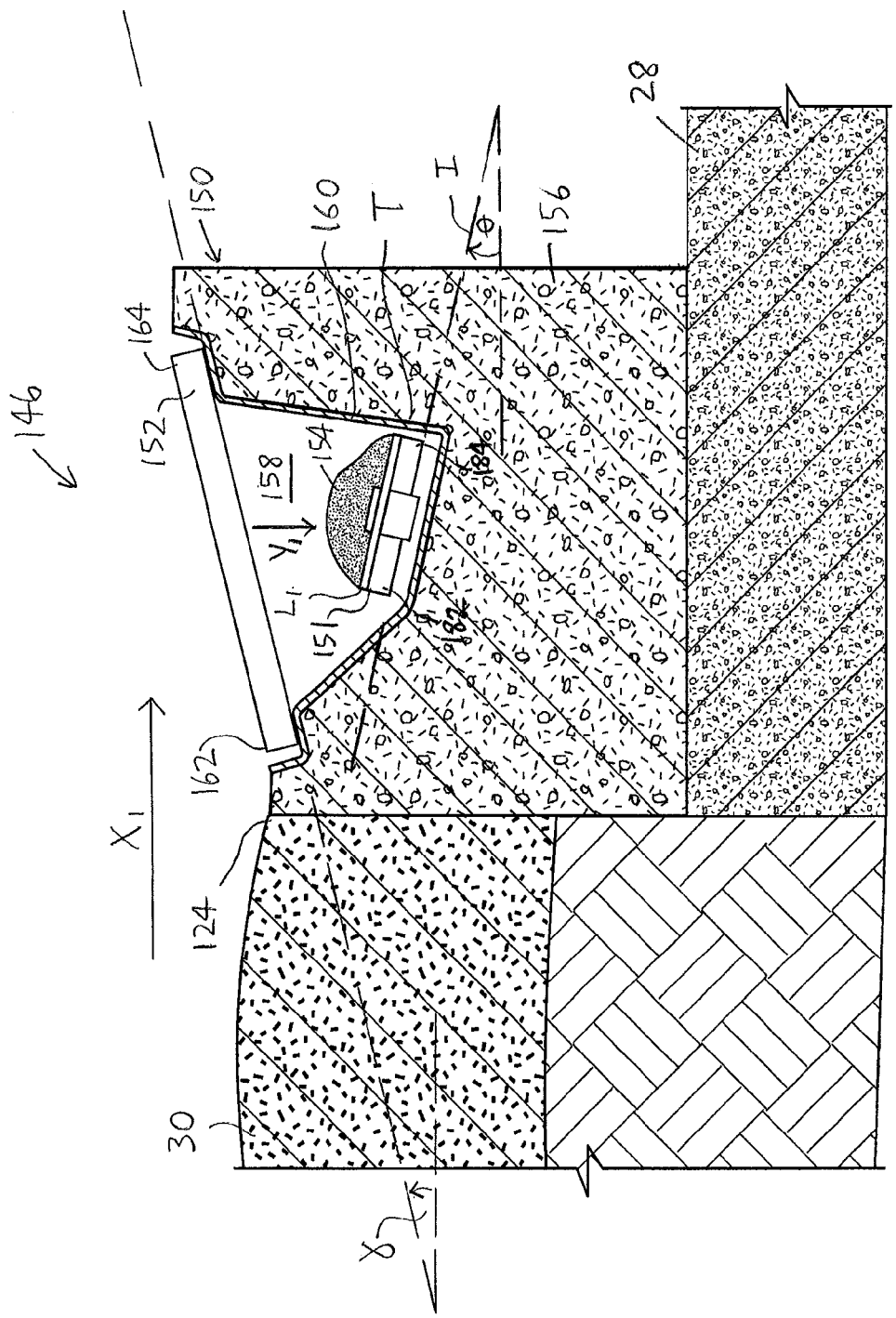
FIG. 3B is a cross-section of a portion of the stall of FIG. 3A, drawn at a larger scale.
Figure 3C:
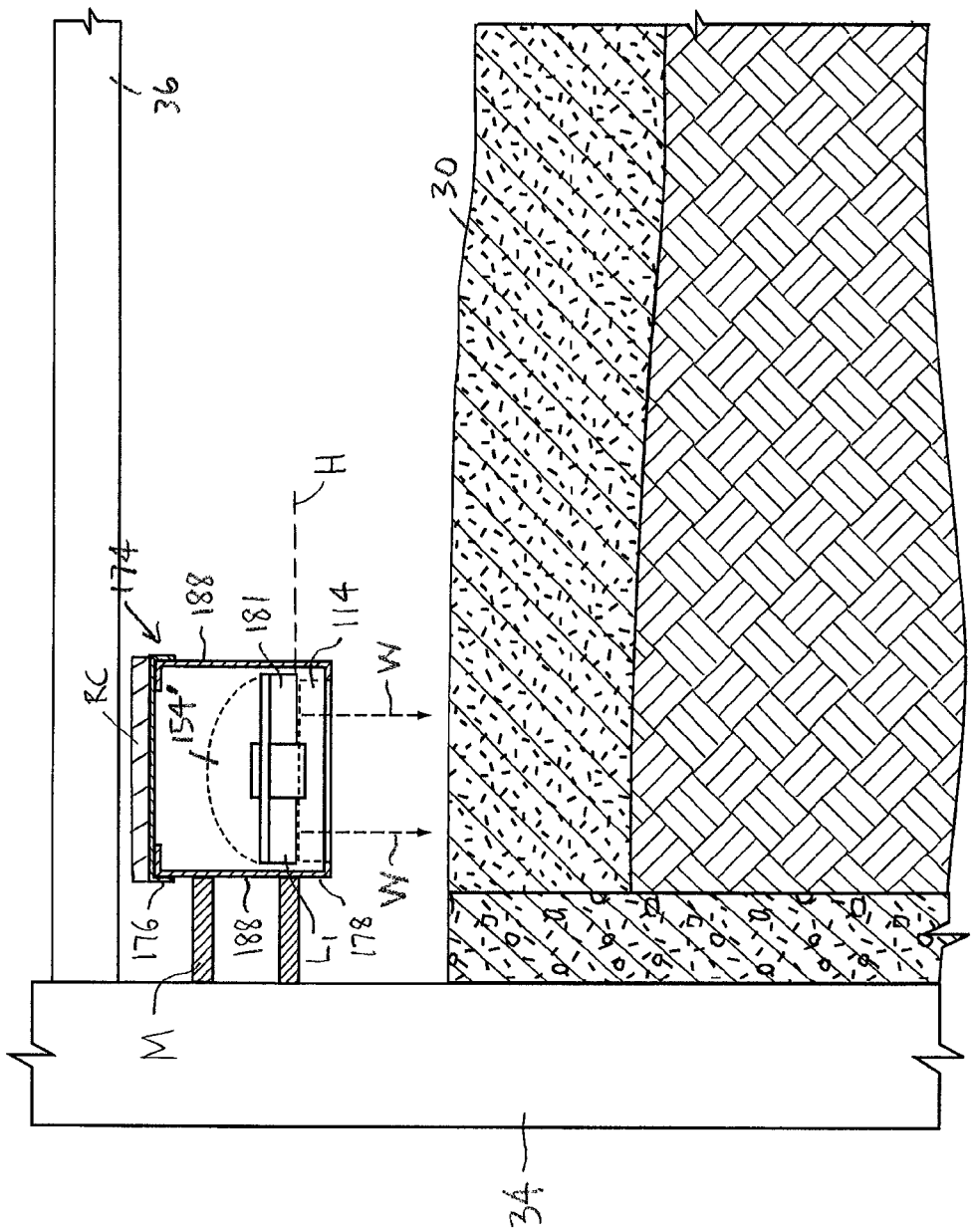
FIG. 3C is a cross-section of another portion of the stall of FIG. 3A, drawn at a larger scale.

As can be seen in FIGS. 2-3C, the enclosure region 121 extends between the lower end 124 and an upper end 122. The upper end 122 preferably is at an elevation higher than that of the lower end 124 (FIG. 3A). In one embodiment, the predetermined path "P" is between the preselected region 146 and the upper end 122 of the enclosure region 121, i.e., the discharge location "S" preferably is the upper end 122 of the enclosure region 121 of the stall (FIGS. 2, 3A).

As will be described, the discharge location "S" may be any suitable location. For instance, in one embodiment (illustrated in FIGS. 11A-11C), the discharge location "S" may be remote from the enclosure region 121.

As can be seen in FIGS. 3A and 3B, in one embodiment, the support assembly 150 preferably includes a curb 156 having the slot "T" therein and one or more support bodies 160 positioned in the slot "T". Preferably, the support body 160 also at least partially defines a channel 158 in which the part 151 of the transportation element 142 is receivable (FIG. 3B). It can also be seen in FIG. 3B that the grate 152 preferably has an inner side 162 positioned proximal to the lower end 124 of the enclosure region 121 and an outer side 164 positioned outwardly relative to the inner side 162, when the grate 152 is supported by the support body 160.

As illustrated in FIG. 2, the conveyor system 138 is for transporting the sand 30 in connection with three stalls that are aligned. The two stalls illustrated in FIG. 2, in addition to the stall 120, are identified as stalls 120A and 120B for convenience. (For clarity of illustration, no cows are illustrated in FIG. 2.) The direction of travel of the transportation element 142 is schematically indicated by arrows identified by "D" in FIG. 2. It will be understood that the arrangement illustrated in FIG. 2 is exemplary only, and more or fewer stalls may be served by the conveyor system 138, as desired.

Those skilled in the art would appreciate that the transportation element 142 may be made of any suitable materials, arranged in any suitable manner. As will be described, in one embodiment, the transportation element 142 includes a series of links "L" (FIG. 8D) in a chain that are connected together to form an endless loop. For the purposes hereof, the links that are loaded with sand as they move through the preselected region are sometimes referred to as the "loaded" links. Loaded links "$L_1$" are illustrated in FIGS. 3B and 3C. As can be seen in FIG. 2, the conveyor system 138 preferably includes the trough elements identified for convenience as 104A-104G, located at selected locations on the predetermined path "P".

It will be understood that, when the transportation element 142 is in use, the transportation element 142 preferably is pulled so that it is relatively taut. However, it will also be understood that the transportation element 142 generally is dragged along the floors 110 of the trough elements 104. Also, the part 151 of the transportation element 142 also tends to be dragged along a bottom part 163 of the support body 160. When the drive subassembly 144 is energized, the part 151 of the transportation element 142 is generally held in the channel 158 and dragged along the bottom part 163 of the support body 160.

It will be understood that the trough elements 104 may extend between the support body 160 and an upper housing 174 (FIG. 2) (i.e., interrupted by the guide subassemblies 148 therebetween) so that the loaded links are located in the trough elements when moved from the preselected region 146 to the upper housing 174, except at the corners, where the loaded links are guided by the guide subassemblies. In each trough element 104, the walls 106, 108 and the floor 110 partially define a trough channel 112 (FIGS. 7C, 7D) through which the transportation element 142 is moved.

The trough element 104 illustrated in FIG. 7C shows the configuration of the trough element 104D. The floor 110 of the trough element 104D preferably is substantially aligned with the bottom part 163 of the support body 160. It will be understood that the floor of the trough element 104C also is substantially aligned with the bottom part 163. It can be seen that, in this way, the portion of the transportation element moving between the pulleys 186B and 186C is positioned substantially in an inclined plane "I", as will be described.

The trough element 140 illustrated in FIG. 7D shows the configuration of the trough element 104E. In this trough element, the walls 106, 108 are substantially at right angles to the floor 110, as will also be described.

Any suitable link design may be used for the links in the transportation element 142. Those skilled in the art would be aware that a variety of link designs may be used. As can be seen in FIGS. 8D and 9A, each link "L" preferably includes two partially planar side elements 166A, 166B that are joined by front and rear bridges 168, 170. The side elements 166A, 166B and the front and rear bridges 168, 170 preferably define a hole 172 in which a tooth of a gear (not shown in FIGS. 8D and 9A) can be received, for driving the transportation element 142, as will be described. In one embodiment, each link preferably is about 2.75 inches (approximately 7 cm) wide at its widest, and about 2 inches (approximately 5.1 cm) long.

The links "L" are joined together in any suitable manner, as would be known to those skilled in the art. Preferably, the links are connected so as to permit pivoting movement of each link relative to the links it is connected to. In one embodiment, the front bridge 168 preferably includes a connector 168A that is curled forwardly to define a pocket "PC" (FIGS. 8C, 8D) in which the rear bridge 170' of a preceding link "PL" (FIG. 8D) is partially receivable, to connect the preceding and the trailing links. Because the manner in which the links "L" are joined together is known, it is unnecessary to describe the connections of the links with each other in more detail.

As can be seen in FIG. 8D, in one embodiment, it is preferred that the rear bridge 170 forms a sloped portion "$R_1$" located at least partially below the rear bridge of the preceding link. It is also preferred that the side elements 166A, 166B include sloped portions "$R_2$" and "$R_3$" respectively that are aligned with the sloped portion "$R_1$".

Figure 8A:
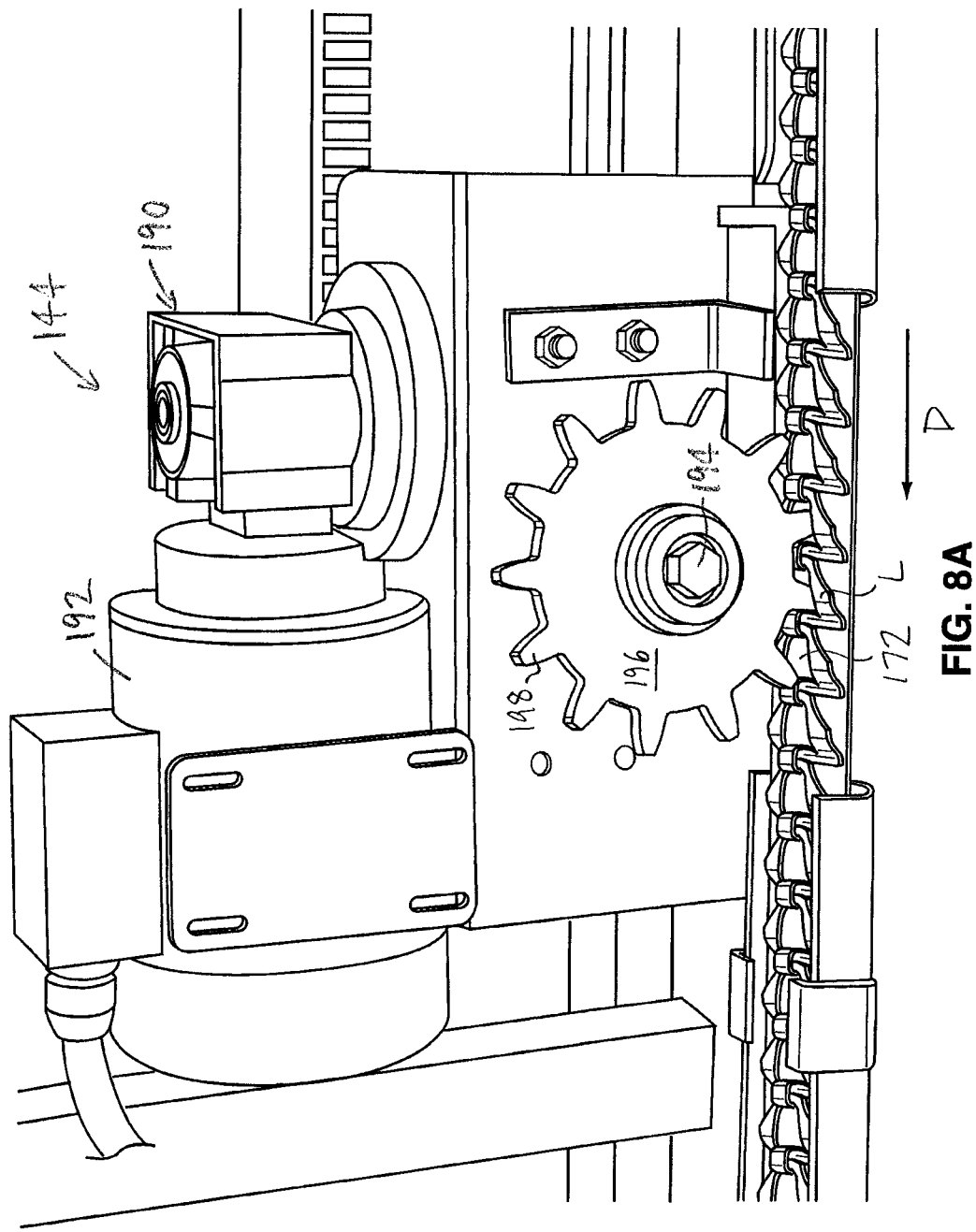
FIG. 8A is an isometric view of an embodiment of a drive assembly of the invention, drawn at a smaller scale.
Figure 8B:
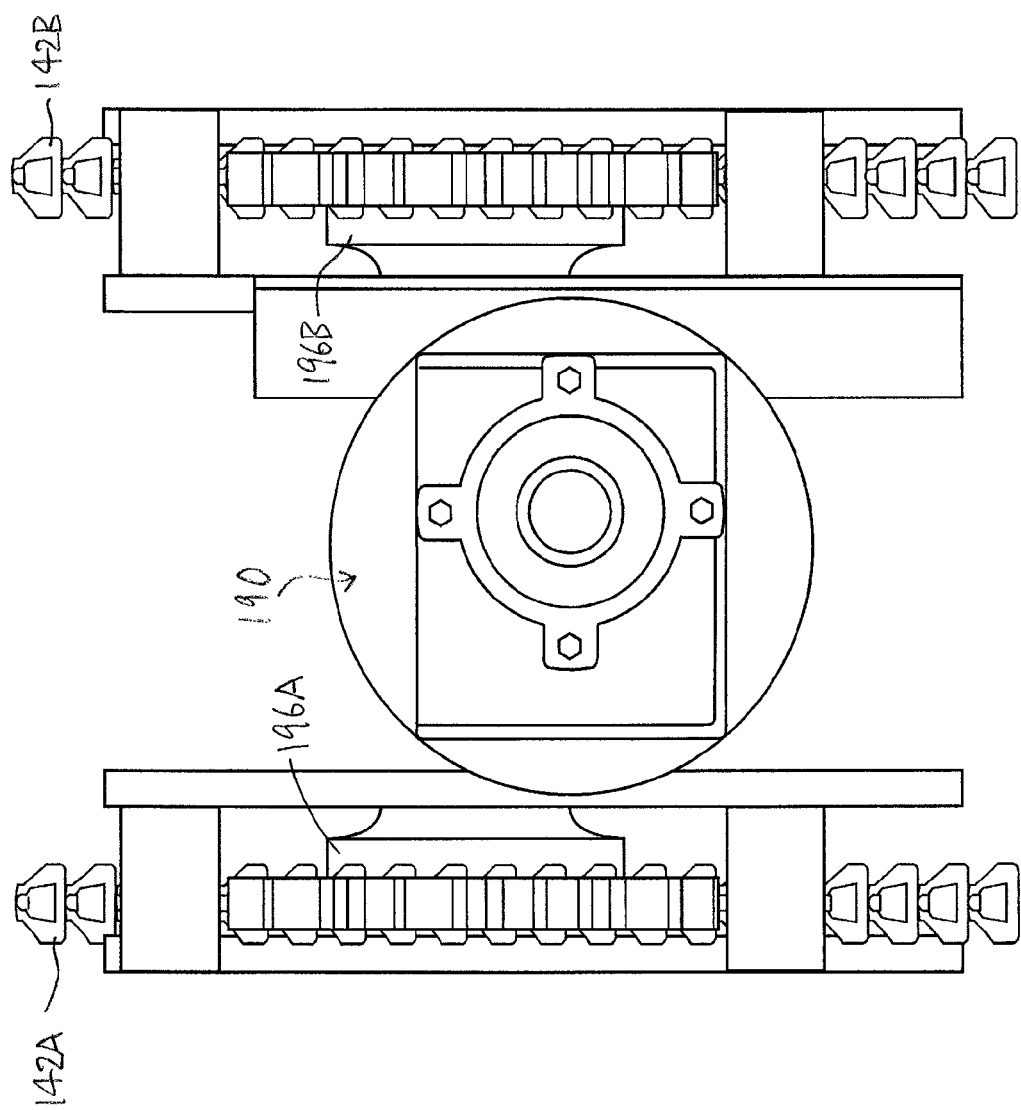
FIG. 8B is a top view of an alternative embodiment of the drive assembly of the invention.
Figure 8C:
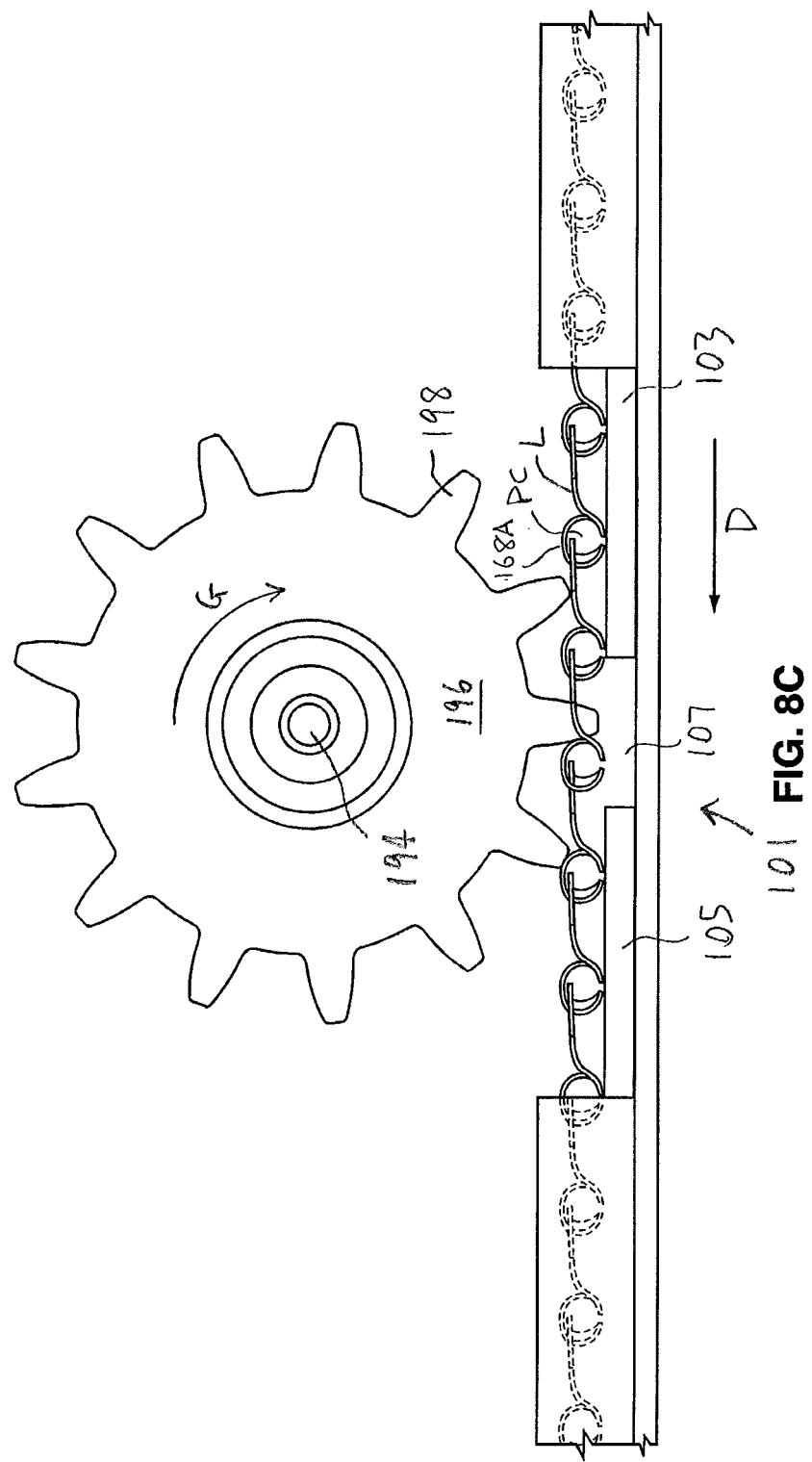
FIG. 8C is a side view of a portion of the drive assembly of FIG. 8A.
Figure 8D:
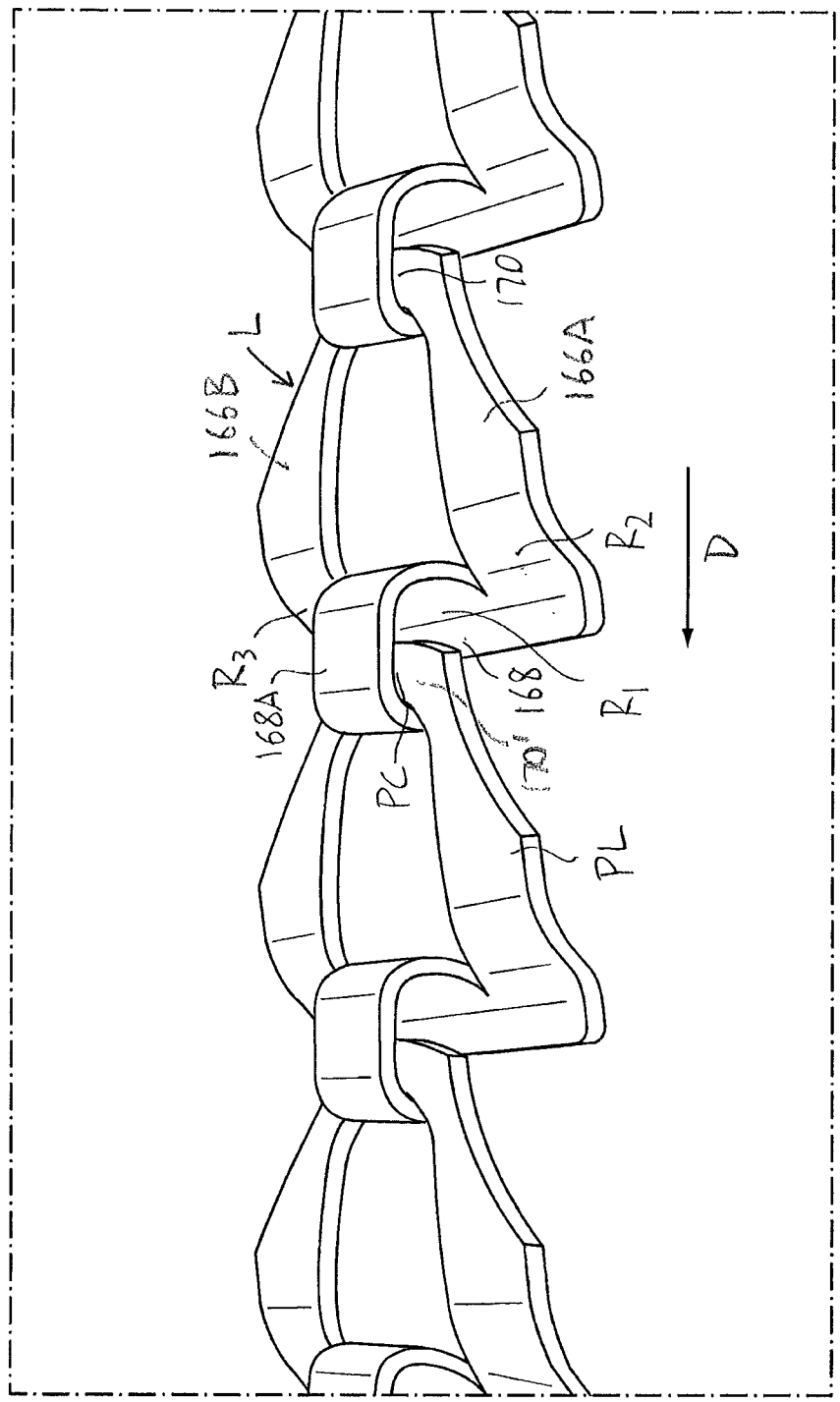
FIG. 8D is a top view of a portion of an embodiment of the transportation element of the invention, drawn at a larger scale.

When the transportation element 142 is operational, it is moved by the drive subassembly 144 in the direction indicated by arrow "D" in FIGS. 8A, 8C, and 8D.

From the foregoing, it can be seen that the portion 154 of the sand 30 is moved from the lower end 124 of the enclosure region 121 to the grate 152 by the cow (not shown in FIG. 2), in the direction indicated by arrow "$X_1$" in FIGS. 2 and 3B. As described above, the sand 30 typically is moved outwardly by the cow in this way when the cow is leaving the stall 120, because of the cow shuffling its hooves as it backs out of the stall in an outward direction. The portion 154 that is moved outwardly falls through the grate 152, in the direction indicated by arrow "$Y_1$" (FIG. 3B). A substantial proportion of the portion 154 of the sand is deposited on a part 151 of the transportation element 142 that is located in the preselected region 146.

A certain proportion of the portion 154 that falls through the grate does not stay on the part 151 of the transportation element 142. In general, sand that falls off a loaded link is pushed along by a following loaded link, and may be picked up on the following link. (Any sand that has fallen off the link and is not moved by other links is not material and is, ultimately, removed from the support body 160 in connection with regular maintenance of the system.) For the purposes hereof, it will be understood that the portion 154 is located on the part 151 of the transportation element 142.

It will also be understood that the part 151 includes the links "L" that are moving through and located in the preselected region 146. Accordingly, the portion 154 of the sand 30 is caught by the parts of each link "L" formed to do so, i.e., the side elements 166A, 166B, and the front and rear bridges 168, 170. As described above, the links on which the portion 154 of the sand is positioned are the loaded links "$L_1$".

As can be seen in FIGS. 2 and 3C, in one embodiment, the conveyor system 138 preferably includes the upper housing 174 positioned proximal to the upper end 122 of the enclosure region 121, in which a segment 181 of the transportation element 142 is receivable (FIG. 3C). As will be described, it is preferred that the upper housing 174 includes a number of apertures 180 through which the portion of the sand transported on the transportation element 142 falls onto the upper end 122 of the enclosure region 121. Preferably, the segment 181 of the transportation element 142 received in the upper housing 174 is positioned substantially horizontally, as will also be described (FIG. 3C).

In the embodiment of the conveyor system 138 illustrated in FIGS. 2-3C, once the portion 154 of the sand is loaded onto the part 151 of the transportation element 142, such portion is moved by the transportation element 142 to the upper housing 174. It will be understood that, although a proportion of the portion 154 of sand 30 falls off the loaded links as the loaded links are moved from the preselected region 146 to the upper housing 174, such proportion is not material, as will be described. For convenience, however, the portion of the sand that is on the loaded links when they arrive at the upper housing 174 is identified by the reference numeral 154' (FIG. 3C).

From the foregoing, it will be understood that the portion 154 of the sand is moved (i.e., carried and/or pushed) by the loaded links from the preselected region, and then through the trough element 104D, with the links dragged along the floor 110 thereof. At the pulley 186C, the loaded links are guided into the trough element 104E. The portion 154 of the sand is moved by the loaded links through the trough element 104E in the same way, i.e., the links are dragged along the floor 110, and the portion 154 is partly carried, and partly pushed, by the loaded links. The loaded links are then guided by the pulley 186D into the trough element 104F, and subsequently moved into the upper housing 154.

Figure 10A:
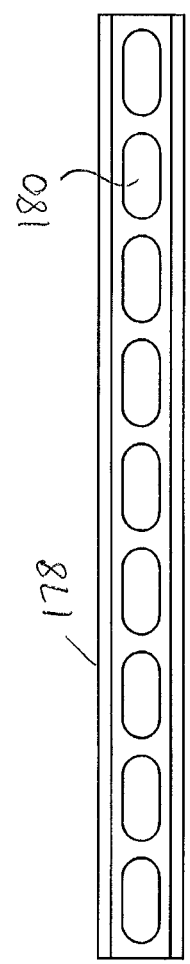
FIG. 10A is a top view of an embodiment of a lower part of an upper housing of the invention, drawn at a smaller scale.
Figure 10B:
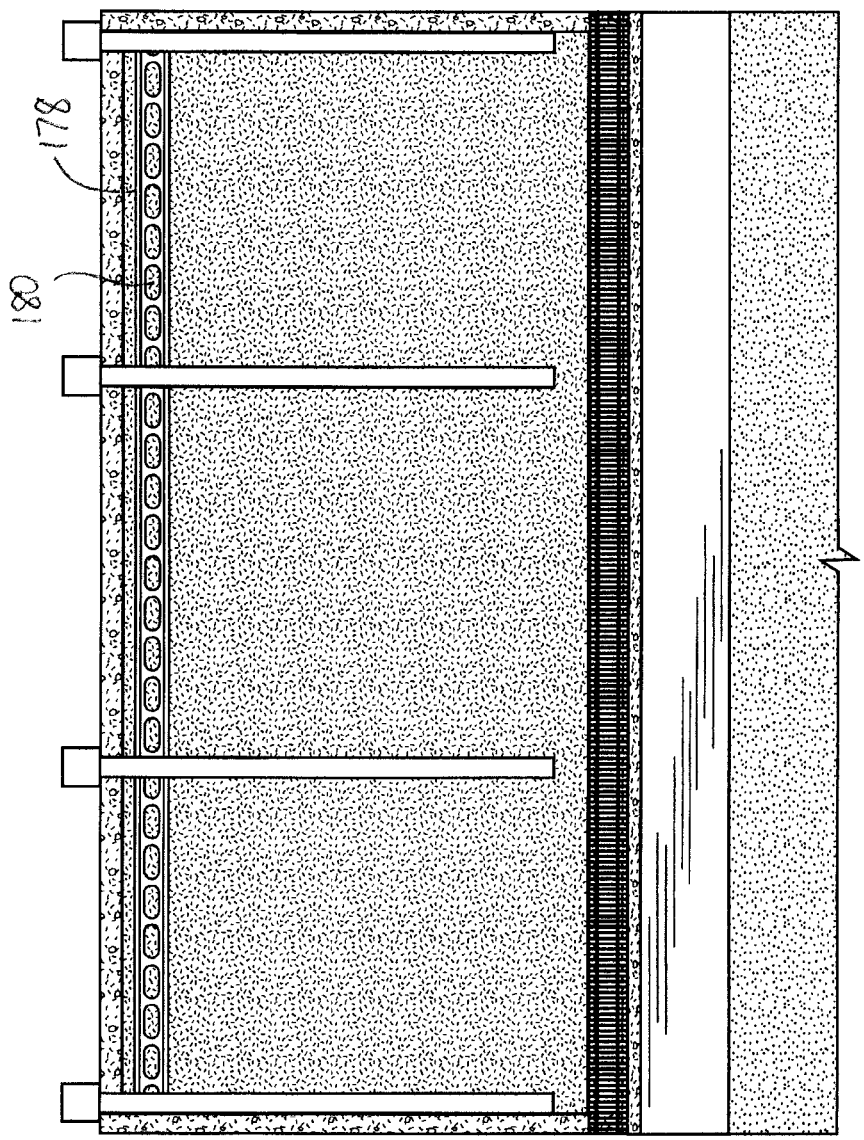
FIG. 10B is a top view of the lower part of FIG. 10A positioned above the upper ends of the enclosure regions of three stalls, drawn at a smaller scale.

An embodiment of the upper housing 174 is illustrated in FIGS. 2, 3A, 3C, 10A, and 10B. Preferably, the upper housing 174 extends across the upper ends 122 of the enclosure regions 121 of each of the stalls 120, 120A, 120B (FIG. 2). As can be seen in FIGS. 3C, 10A, and 10B, the upper housing 174 preferably includes an upper part 176 and a lower part 178. It is also preferred that the lower part 178 includes the apertures 180 (FIG. 10A). As can be seen in FIGS. 2, 3A, 3C, and 10B, the lower part 178 is formed so that the apertures 180 are positioned substantially below the segment 181 of the transportation element 142, to permit the portion 154' of the sand 30 to fall from the loaded links onto the upper end 122, as schematically illustrated by arrows "W" in FIG. 3C.

It will be understood that, in FIG. 10B, the transportation element 142 and the top part 176 are omitted for clarity of illustration.

The upper housing 174 preferably is supported above the upper end 122 of the enclosure region 121 by any suitable means. In one embodiment, as can be seen in FIG. 3C, the upper housing 174 preferably is supported by one or more hanger brackets "M" that are secured to the posts 34.

In one embodiment, it is preferred that the part 151 of the transportation element 142 in the preselected region 146 has an inward side 182 proximal to the lower end 124 of the enclosure region 121 and an opposite outward side 184. Preferably, the part 151 of the transportation element 142 is positioned with the outward side 184 lower than the inward side 182, to define a preselected transportation element angle θ relative to the horizontal. For instance, in one embodiment, the preselected transportation element angle θ preferably is approximately 15°. Those skilled in the art would appreciate that the transportation element 142 preferably is at least partly positioned at the preselected transportation element angle θ in order to enable the transportation element 142 to move the portion of the sand from a lower elevation (i.e., the preselected region 146) to a higher elevation (i.e., the upper housing 174).

Those skilled in the art would also appreciate that various arrangements are possible, and the embodiments illustrated in FIGS. 2-3C are exemplary only. For instance, as will be described, in an alternative embodiment of the conveyor system of the invention, the transportation element preferably is positioned in a substantially horizontal plane.

As noted above, in one embodiment, it is preferred that the part 151 of the transportation element 142 is positioned at the preselected transportation element angle θ in order to enable the transportation element 142 to move the portion upwardly, for discharge at the upper housing 174 (FIG. 3A). In FIG. 2, it can be seen that four pulleys 186 (designated 186A, 186B, 186C, and 186D for convenience) preferably are positioned to guide the transportation element 142 along the predetermined path "P". In one embodiment, the pulleys 186A-186D preferably are also positioned for rotation thereof in the inclined plane defined by the preselected transportation element θ. It would be appreciated by those skilled in the art that this arrangement enables the links of the transportation element to be pulled smoothly from the preselected region up to the upper housing, and also to be pulled smoothly from the upper housing down to the preselected region.

For clarity of illustration, the inclined plane is schematically illustrated and identified as "I" in FIG. 3B, and the horizontal plane at which the segment 181 is positioned is schematically illustrated and identified as "H" in FIG. 3C.

As can be seen in FIG. 2, the loaded links are moved from the preselected region 146 through the trough element 104D to the pulley 186C, which causes a 90° change in direction and directs the loaded links through the trough element 104E. It will be understood that, because the floor 110 of the trough element 104D is substantially aligned with the bottom part 163 of the support body 160, the loaded links preferably are maintained in the inclined plane "I" as they move through the trough element 104C. It will also be understood that the trough element 104E is positioned with its floor 110 substantially in the inclined plane "I", so that the loaded links are substantially in the inclined plane "I" as they are moved through the trough element 104E.

In one embodiment, the segment 181 of the transportation element 142 preferably is positioned substantially horizontally inside the upper housing 174. This requires a transition from the inclined plane to the horizontal plane where the transportation element 142 enters the upper housing 174, and another transition from the horizontal plane to the inclined plane when the transportation element 142 exits the upper housing 174. Preferably, the transition from the inclined plane to the horizontal plane is effected over a first transition distance "$Q_1$" between the pulley 186D and the upper housing 174 (FIG. 2). Also, the transition from the horizontal plane to the inclined plane preferably is effected over a second transition distance "$Q_2$" between the upper housing 174 and the pulley 186A. In practice, it has been found that each of the first and second transition distances "$Q_1$", "$Q_2$" preferably is about 4 feet (approximately 1.2 meters).

The trough element 104F is positioned along the first transition distance "$Q_1$". Preferably, the trough element 104F is configured so that its walls 106, 108 are substantially at right angles to its floor 110. It will be understood that, although the loaded links are in the inclined plane when engaged by the pulley 186D, the loaded links gradually move to the horizontal plane "H" (i.e., through the first transition distance "$Q_1$" as they move to the upper housing 174, because the links in the upper housing 174 are dragged along the substantially horizontal lower part 178.

The portion 154' of the sand 30 falls through the apertures 180 when the loaded links pass through the upper housing 174. In practice, it has been found that the sand falls through the first open aperture 180 encountered until sufficient sand has piled up beneath that aperture to substantially fill that aperture. Up to a point, sand tends to accumulate in the upper housing, and the sand accumulated also tends to push the portion 154' off the loaded links entering the upper housing. Due the tendency for sand to accumulate in the upper housing 174, it is preferable that sufficient clearance be provided between the respective side walls 188 and the segment 181 of the transportation element 142. In one embodiment, for example, the clearance preferably is at least about 0.375 inch (approximately 0.95 cm).

The sand in the upper housing 174 (including the portion 154') is generally pushed by the sloped portions "$R_1$", "$R_2$", "$R_3$" of the links of the transportation element 142 along the lower part 178 until the sand reaches an open aperture 180 and falls therethrough. The sand tends to be pushed due to engagement thereby with the sloped portions of each link "L".

In summary, the sand tends to fall of the loaded links as they are passing through the upper housing 174 because the apertures 180 that are not plugged with sand permit it. There is a tendency for the upper ends 122 immediately below the first few apertures in the upper housing to be generally relatively full of sand, and the upper ends under the further downstream apertures tend to have less sand in them. Those skilled in the art would appreciate that the amount of the charge of the sand to be added to each enclosure region 121 respectively, which is to be determined by the operator in each case, preferably is within a range, i.e., neither too large nor too small.

When the sand is relatively damp, the sand tends not to flow readily off the loaded links. For instance, the dampness may be due to high relative humidity in the atmosphere, or urine from the cows. In order to address this, the upper housing 174 optionally may include one or more bump elements 114 for causing vibration or jiggling of the loaded links passing through the upper housing 174, to shake the damp sand off the loaded links. As can be seen in FIG. 3C, the bump elements 114 preferably are mounted on the lower part 178. In one embodiment, each bump element 114 preferably is a bar positioned with an upper surface thereof at a height for disrupting the movement of the links through the upper housing. Preferably, there are a number of bump elements 114 positioned inside the upper housing 174, spaced apart from each other by a predetermined distance. When one of the loaded links encounters one of the bump elements 114, the loaded link is rapidly moved upwardly until it can pass over the bump element 114. The bump element preferably is relatively narrow, so the loaded link rapidly falls down after passing over the bump element 114. The result is that the loaded links are shaken as they are moved along the upper housing 174, thereby causing the portion 154' of the sand to fall off.

It will be understood that the trough element 104G is formed and positioned to correspond to the trough element 104F. The links of the transportation element 142 moving through the trough element 104A (i.e., through the second transition distance "$Q_2$") are twisted gradually as they move therethrough, until they are in the inclined plane "I" when they engage the pulley 186A, because the pulley 186A is substantially aligned for guiding the links in the inclined plane "I". The trough elements 104A and 104B also correspond to the trough element 104E. As noted above, the trough element 104C has a floor 110 that is substantially aligned with the bottom part 163 of the support body 160.

It will be understood that the grate 152 may be positioned in any suitable way. For instance, in one embodiment, the grate 152 may be positioned substantially horizontally. It is preferred that the grate 152 is positioned by the curb 156 and the support body 160 at a preselected grate angle γ relative to the horizontal, with the outer side 164 of the grate 152 raised relative to the inner side 162 of the grate 152, to locate the grate 152 to receive the sand 30 moved outwardly from the stall by an animal positioned therein (FIG. 3B). The preselected grate angle γ preferably is approximately 11.5°. The reason for positioning the grate 152 in this way (i.e., angled slightly upwardly) is that it appears to be more likely to receive the portion 154 of the sand kicked or otherwise moved outwardly from the lower end 124 of the enclosure region 121 by the cow, e.g., as the cow backs out of the stall 120.

Figure 4:
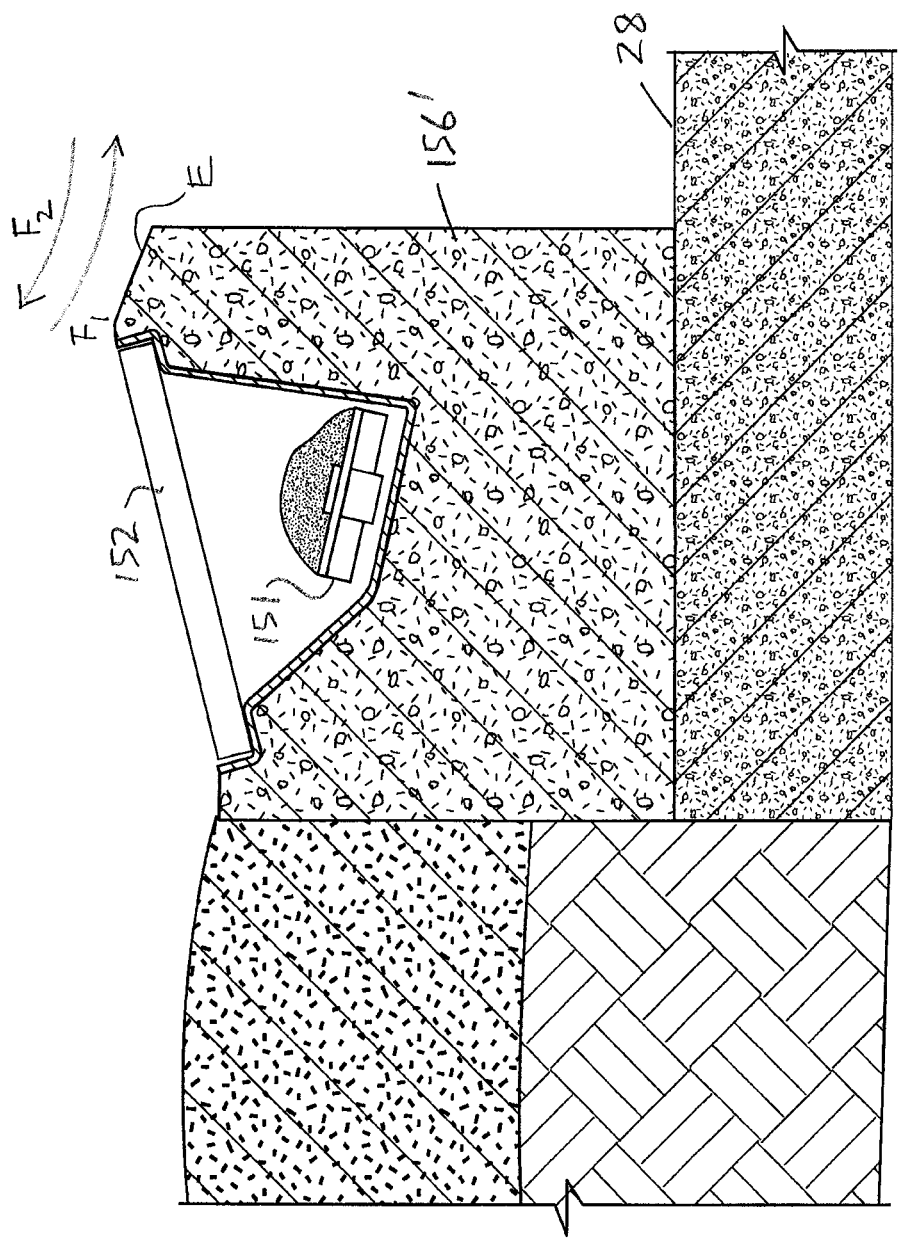
FIG. 4 is a cross-section of a portion of an embodiment of a stall of the invention including an alternative embodiment of a curb of the invention, drawn at a smaller scale.

In an alternative embodiment illustrated in FIG. 4, the curb 156' preferably includes a flattened region "E" positioned proximal to the gutter 28, for permitting movement of the animal between the animal stall 120 and the gutter 28. For instance, the arc of the cow's hooves as the animal steps down from the curb 156' to the gutter 28 is schematically illustrated by arrow "$F_1$" in FIG. 4. The arc of the animal's upward step is schematically illustrated by arrow "$F_2$". Because of the flattened region "E", the animal is less likely to catch its hoof on an outer part of the curb.

In one embodiment, and as can be seen in FIGS. 8A and 8C, the drive subassembly 144 preferably includes one or more motor subassemblies 190 having a motor 192, a shaft 194 rotatable by the motor 192, and one or more gears 196 mounted on the shaft 194. Preferably, the gear 196 includes a number of teeth 198 for engaging the transportation element 142, to move the transportation element 142 along the predetermined path "P". As can be seen in FIGS. 8A and 8C, part of each tooth 198 is receivable in the hole 172 in each link "L".

Any suitable motor may be used, controlled in any suitable manner. Those skilled in the art would be aware of suitable motors. It has been found that an electric motor, adapted to provide appropriate horsepower for the application, is suitable. Also, it has been determined that constant operation, at a relatively slow speed, appears to be preferable to intermittent operation.

It is also preferred that the drive subassembly 144 includes a split shoe subassembly 101 for supporting the transportation element 142 (FIGS. 8A, 8C). In one embodiment, the split shoe subassembly 101 preferably includes an upstream portion 103 and a downstream portion 105 (FIG. 8C). The upstream and downstream portions 103, 105 preferably are separated by a gap 107 to permit sand on the transportation element 142 to pass through the gap 107 under the influence of gravity upon engagement of the gear 196 with the transportation element 142.

As can be seen in FIGS. 8A and 8C, in one embodiment, the gear 196 preferably rotates in the direction indicated by arrow "G", causing the teeth 198 to engage the links "L" respectively, pulling the transportation element 142 in the direction indicated by arrow "D".

In an alternative embodiment illustrated in FIG. 8B, two gears 196A, 196B are mounted on the shaft 194. The gears 196A, 196B engage and drive transportation elements 142A, 142B respectively. This arrangement preferably is used where the predetermined paths of the two transportation elements 142A, 142B are located sufficiently proximal to each other to permit it.

As can be seen in FIGS. 9A-9D, in one embodiment, the guide subassembly 148 preferably includes a frame 109 and the pulley 186 preferably has a V-shaped groove 113 thereon in which the inward side 182 of the transportation element 142 is at least partially receivable, for engagement with the transportation element 142 in the V-shaped groove 113, to guide the transportation element 142 along at least the portion of the predetermined path "P". The guide subassembly 148 preferably also includes a pulley bracket 115 for locating the pulley 186 in relation to the frame 109 to permit the transportation element 142 to pass between the pulley 186 and the frame 109 while the transportation element 142 is engaged by the pulley 186. For instance, where the pulleys are positioned in the inclined plane "I", they are preferably positioned therein by the respective pulley brackets 115 therefor.

It is also preferred that the guide subassembly 148 includes one or more wear plates 117 mounted on the frame 109, for resisting wear due to sliding engagement of the transportation element 142 with the wear plate 117, when the transportation element 142 is at least partially engaged with the pulley 186. In one embodiment, the guide subassembly 148 preferably also includes one or more guide elements 119 for guiding the transportation element through the pulley 186 and along the predetermined path "P". For clarity, in FIG. 9B, the guide elements are identified by reference numerals 119A and 119B.

As can be seen in FIG. 2, in one embodiment, each of the pulleys 186A-186D preferably guides the transportation element 142 around a right angle turn. As illustrated, the trough elements 104 preferably do not extend into the guide subassemblies. However, it will be understood that, in one embodiment, trough extensions "TE" (FIG. 9A) preferably extend through the guide subassemblies. The trough extensions "TE" preferably fit under the frame 109.

Figure 9B:
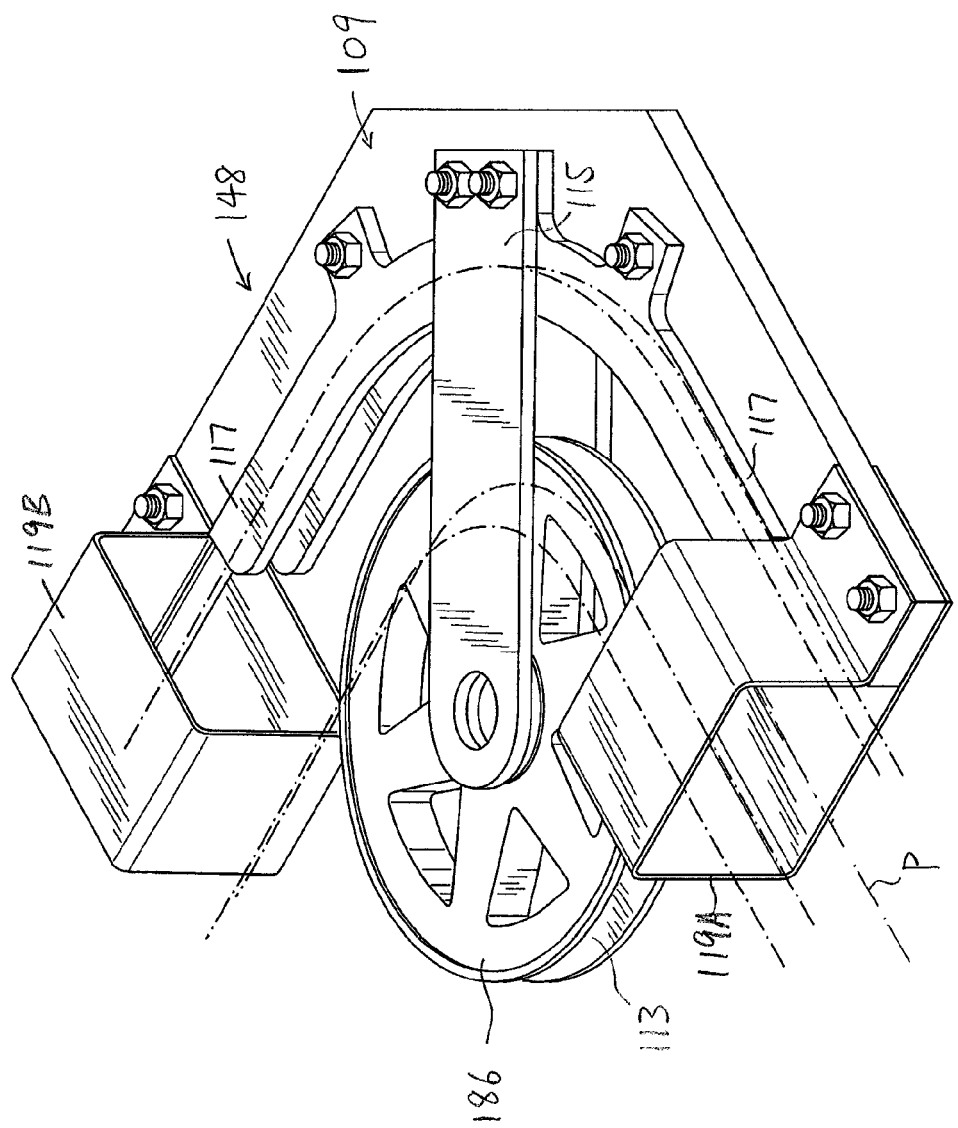
FIG. 9B is an isometric view of the guide subassembly of FIG. 9A, drawn at a larger scale.
Figure 9C:
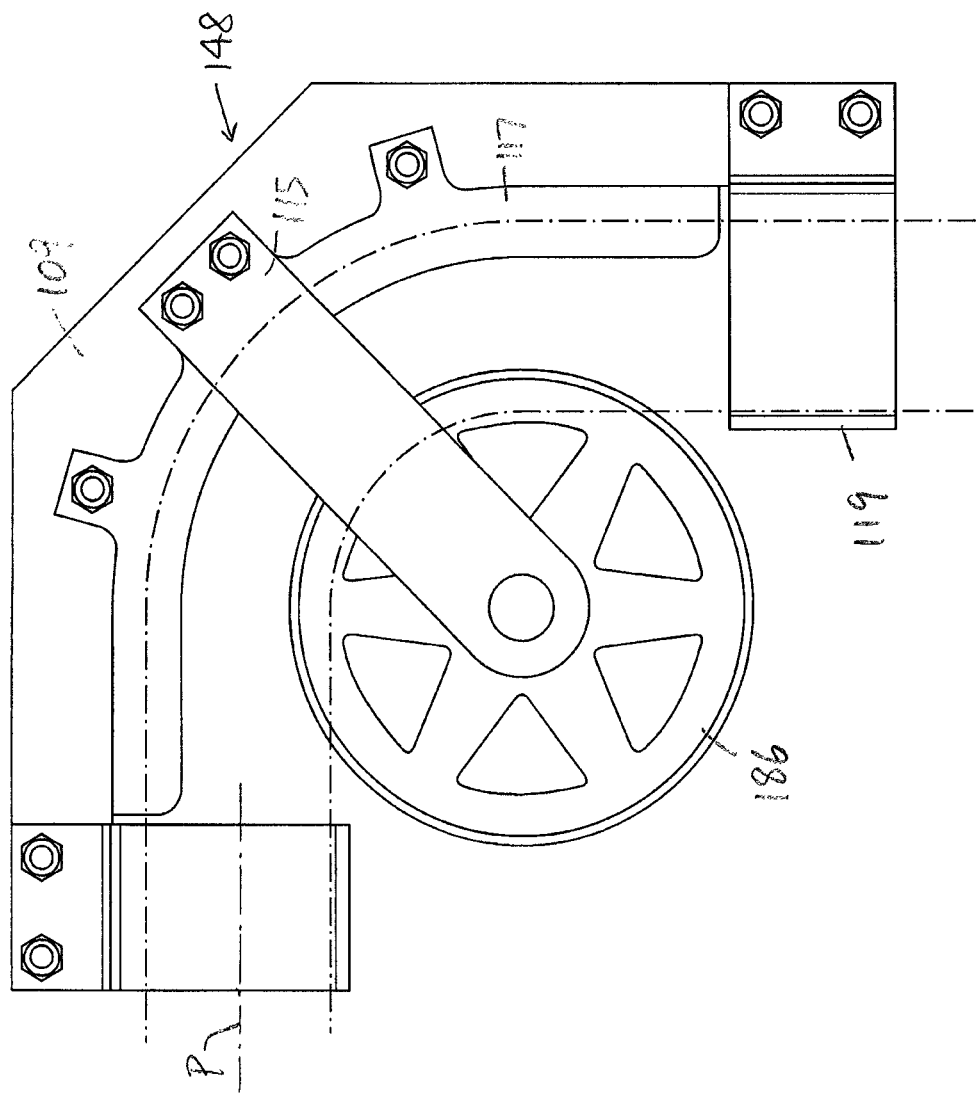
FIG. 9C is a top view of the guide assembly of FIGS. 9A and 9B, drawn at a smaller scale.
Figure 9D:
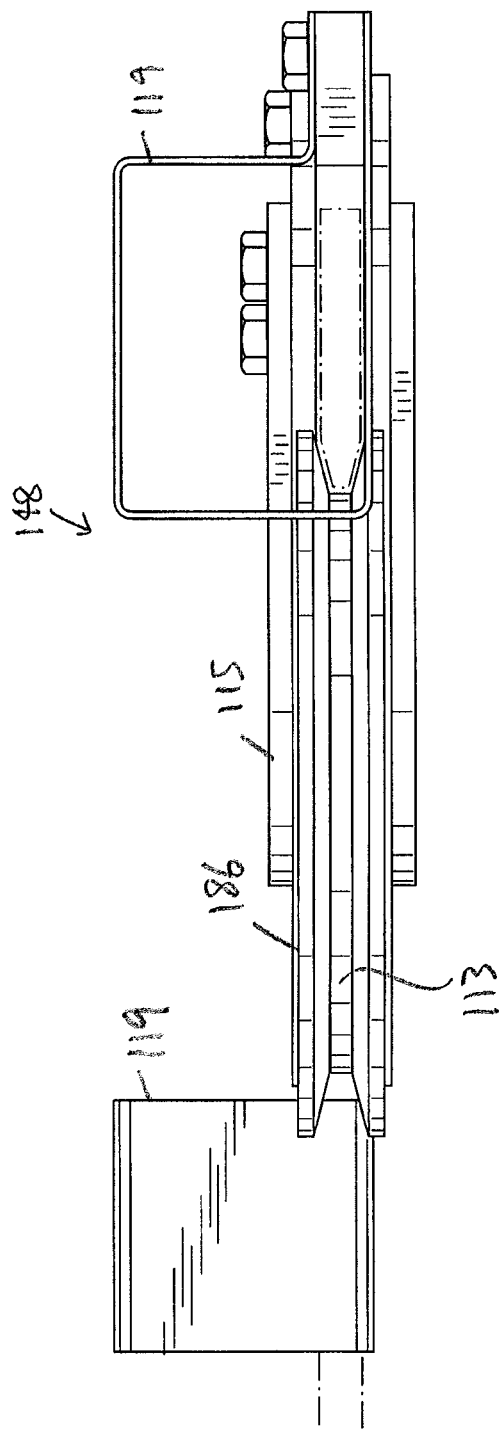
FIG. 9D is a side view of the guide assembly of FIGS. 9A and 9B.

In another embodiment, the guide subassembly 148 preferably does not have a floor or trough extension in it, as illustrated in FIGS. 9B-9D. In this situation, when the conveyor system is first activated, sand is dumped in the area proximate to the pulley 186C, by loaded links engaging the pulley 186C. However, the sand gradually accumulates under the guide subassembly 148 that includes the pulley 186C until it forms a floor or bed on which the transportation element 142 runs, and the portion 154 is then carried and pushed by the loaded links to the guide subassembly 148 that includes the pulley 186D. In the same way, during an initial period, the portion 154 of the sand is discharged by the loaded links engaging the pulley 186D until sufficient sand has been dumped under the guide subassembly 148 to form a bed, or a floor, across which the loaded links carry and push the portion 154 past the pulley 186D, to the upper housing 174. It has been determined that, regardless of whether the guide subassembly 148 includes the trough extension "TE", the losses of sand from the loaded links "L₁" during the passage thereof around the pulleys 186C, 186D are not material.]

It will be understood that many of the elements illustrated in FIG. 2 preferably are covered with one or more coverings, for safety. For instance, each of the pulleys 186A-186D preferably is covered (e.g., with a rubber covering) when they are in operation. These coverings are omitted for clarity of illustration. Also, the upper housing 174 preferably includes a rubber covering "RC" (FIG. 3C) to minimize the risk of injury to the cow.

Those skilled in the art would appreciate that the grate may be provided in any suitable configuration. As can be seen in FIGS. 7A and 7B, in one embodiment, the grate 152 preferably includes side elements "U" and cross-pieces "V" spaced apart from each other. Those skilled in the art would appreciate that the sizes and shapes of the cross-pieces "V", and their spacing apart from each other, preferably is determined by taking into consideration a number of factors. For instance, the spacing between the cross-pieces "V" cannot be so large that the hooves of the animal may fall through. However, where the spacing is relatively small, the volume of sand pushed or dragged outwardly from the lower end 124 may accumulate on the grate, instead of flowing therethrough. It is preferred that the cross-pieces "V" are formed to expose generally rounded surfaces (i.e., without sharp edges), to minimize the risk of injury to the cow.

Figure 5A:
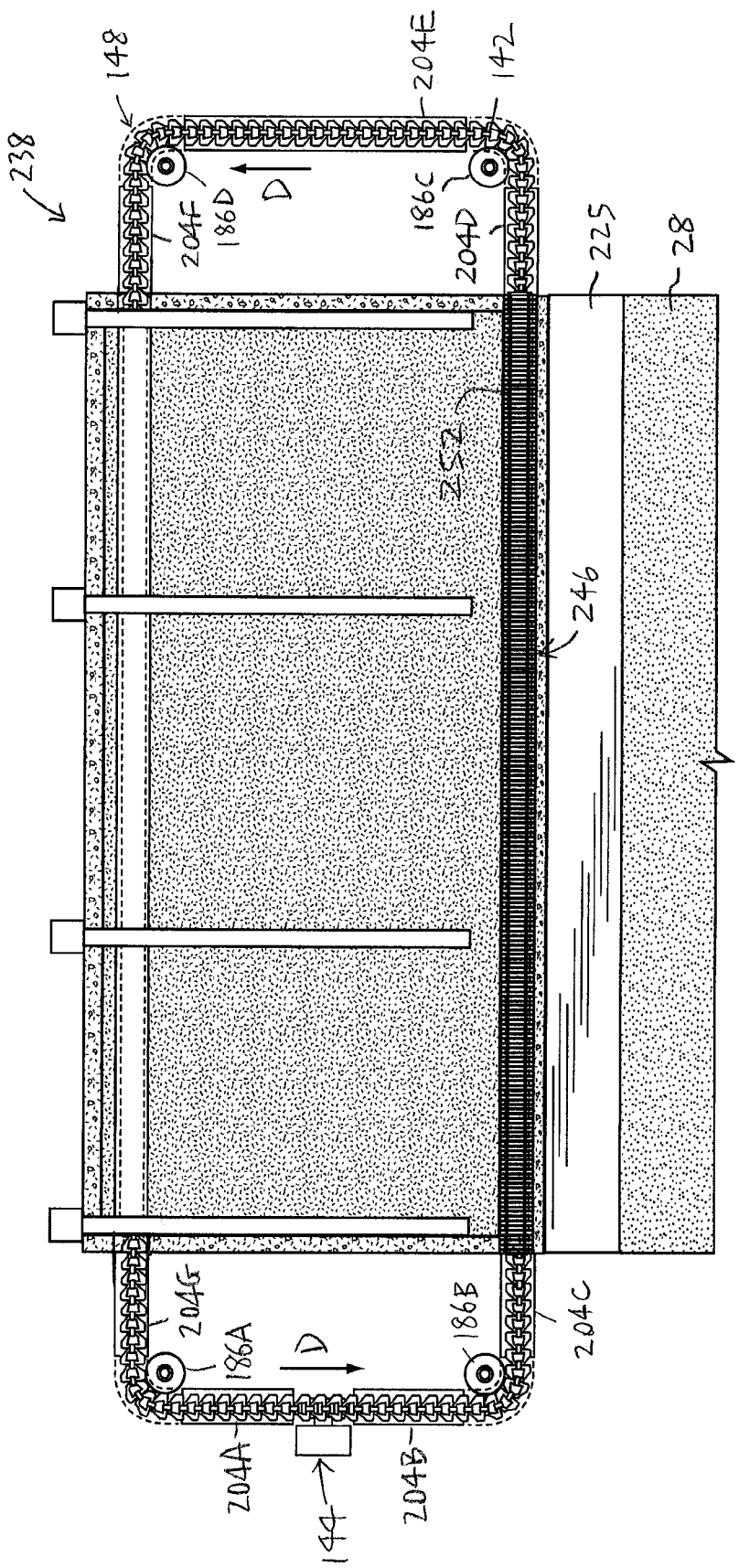
FIG. 5A is a top view of another embodiment of the conveyor system of the invention, drawn at a smaller scale.
Figure 5B:
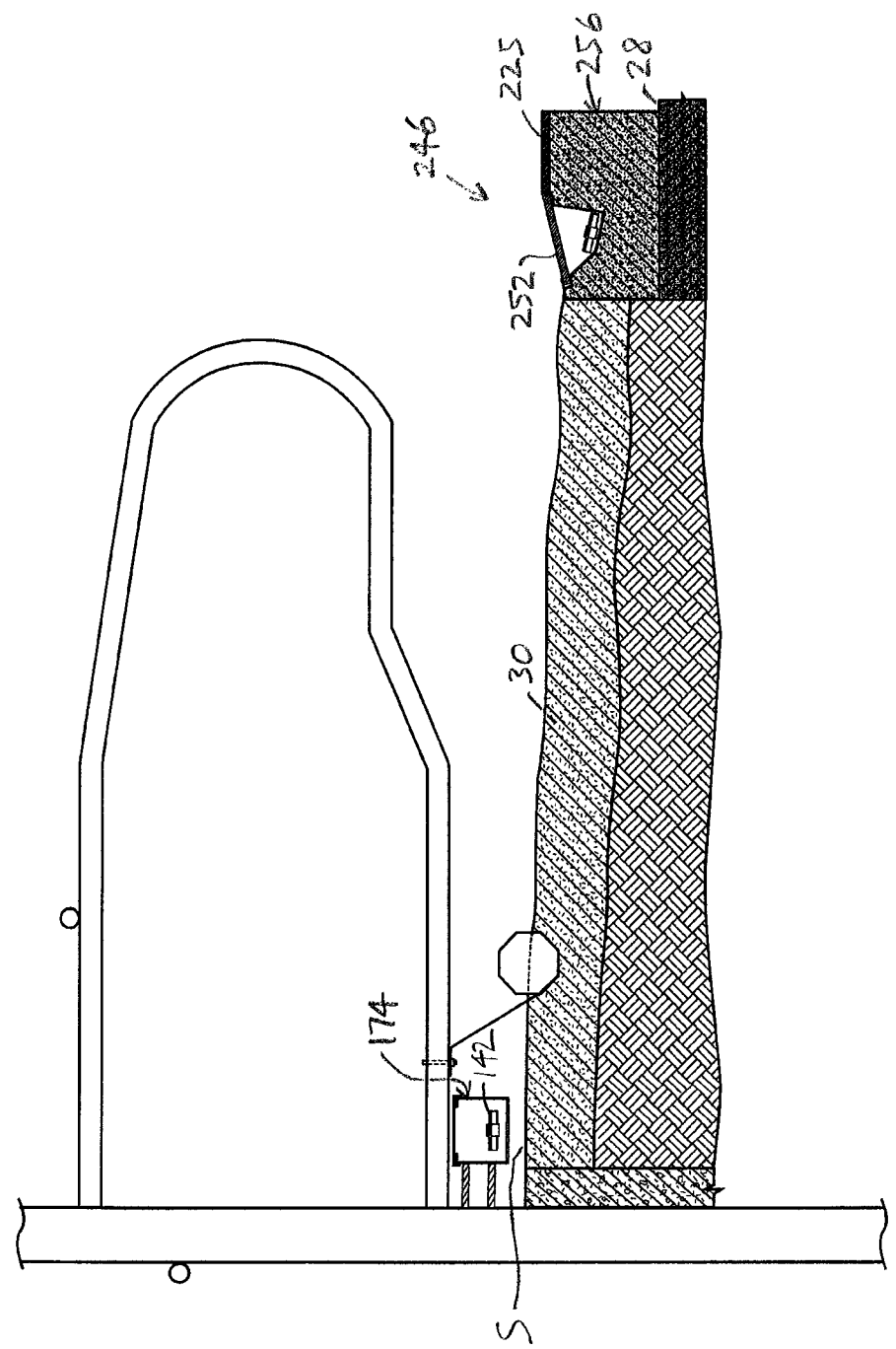
FIG. 5B is a partial cross-section of an alternative embodiment of a stall of the invention, drawn at a larger scale.
Figure 5C:
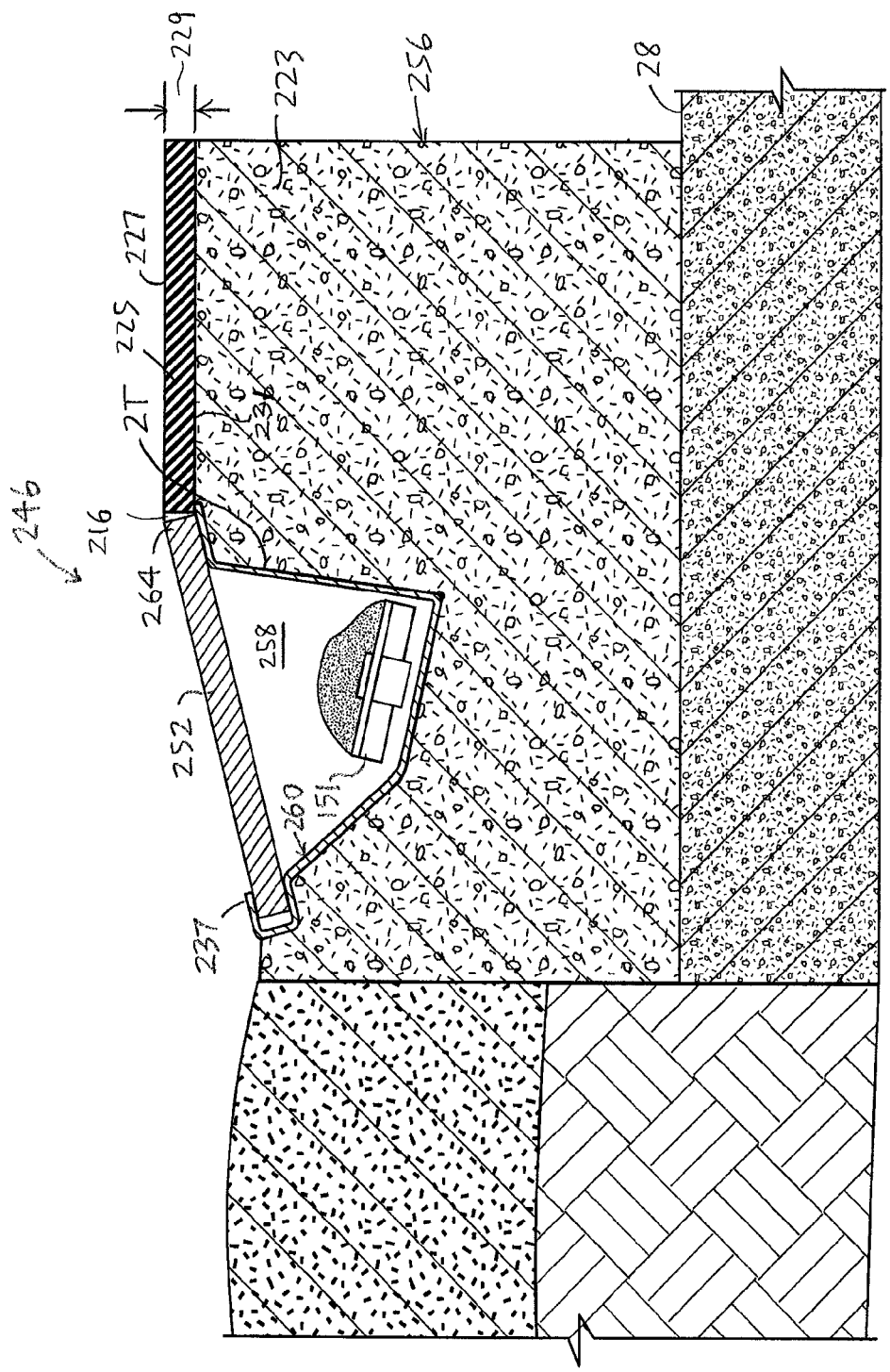
FIG. 5C is a cross-section of a portion of the stall of FIG. 5B, drawn at a larger scale.

An alternative embodiment of the conveyor system 238 of the invention is illustrated in FIGS. 5A-5C. In one embodiment, the conveyor system 238 preferably includes a curb 256 which has an outer part 223 extending between a slot "2T" and the gutter 28. It is also preferred that the system 238 additionally includes a substantially resilient mat 225 positioned on the outer part 223 of the curb, for resiliently supporting the animal. In one embodiment, the outer part 223 preferably has a substantially planar upper surface 227. It is also preferred that the mat 225 has a thickness 229 at least partially defined by a bottom surface 231 thereof positioned on the outer part's upper surface and a top surface 233 thereof, the thickness 229 being sufficient to locate the top surface 233 of the mat 225 substantially horizontally aligned with an upper region 235 of an outer side 264 of a grate 252. In effect, in this embodiment, the grate is positioned closer to the upper wall (e.g., by approximately 8 inches (approximately 20.3 cm)) than in the embodiment illustrated in FIGS. 2-3C.

The mat 225 preferably is made of any suitable material, e.g., a rubber, or a synthetic rubber, and has any suitable thickness. It is believed that the resilient mat 225 improves animal welfare, as it is comfortable for the animal to stand on. Also, it appears that a larger flat area between the lower end of the enclosure region and the gutter may be preferred, for easier entrance into and egress from the stall. The mat 225 also functions as a hygiene barrier, as the urine and fecal matter tends to fall on it, and can easily be removed therefrom into the gutter. The mat 225 preferably is between approximately 0.75 inch (about 1.9 cm) and approximately 1 inch (about 2.54 cm) thick.

As can be seen in FIG. 5C, because the top surface 233 of the mat 225 preferably is substantially at the same elevation as the upper region 235 of the outer side 264 of the grate 252, the animal is unlikely to trip over the mat when exiting the stall. Also, when the animal enters the stall, the animal is unlikely to trip over the outer side 264 of the grate 252. In one embodiment, it is preferred that the mat 225 is cut so that a part 216 thereof fits against and/or over the outer side 264 of the grate 252, to minimize the risk of the animal tripping over the outer side 264 of the grate 252.

As can also be seen in FIG. 5C, the system 238 preferably includes one or more support bodies 260 that each include a lip element 237 for at least partially retaining the grate 252 above the part 151 of the transportation element 142 positioned in a preselected region 246. Preferably, the support body 260 at least partially defines a channel 258 in which the part 151 of the transportation element 142 is receivable.

As can be seen in FIG. 5A, the conveyor system 238 preferably includes trough elements 204A-204G that correspond to the trough elements 104A-104G of the conveyor system 138, described above. It is also preferred that the conveyor system 238 includes guide assemblies 148 with pulleys 186A-186D, and the drive subassembly 144 (FIG. 5A), moving the transportation element 142 in the direction "D". It will be understood that the conveyor system 238 also includes the balance of the guide subassemblies (not shown) to support the pulleys 186A-186D.

Those skilled in the art would appreciate that the conveyor systems 138 and 238 described above include curbs that are formed with slots therein, in which certain elements are positionable, e.g., the support body, partly defining the channel 258 in which the part of a transportation element (e.g., preferably, a chain conveyor) is receivable. However, the invention herein preferably also includes one or more support assemblies 350 that may be used with a typical monolithic curb 26 of the prior art. That is, in one embodiment, the conveyor system 338 of the invention preferably is retrofitted into an older barn without replacing the curbs already in the older barn.

For the purposes hereof, it will be understood that the curb 26 is said to be "monolithic" because it does not have a slot formed therein corresponding to the slots in the curbs in the conveyor systems 138, 238 described above. It will be understood that the monolithic curb 26 may have any suitable shape, and the curb 26 as illustrated in FIGS. 6A-6C is exemplary only.

Figure 6B:
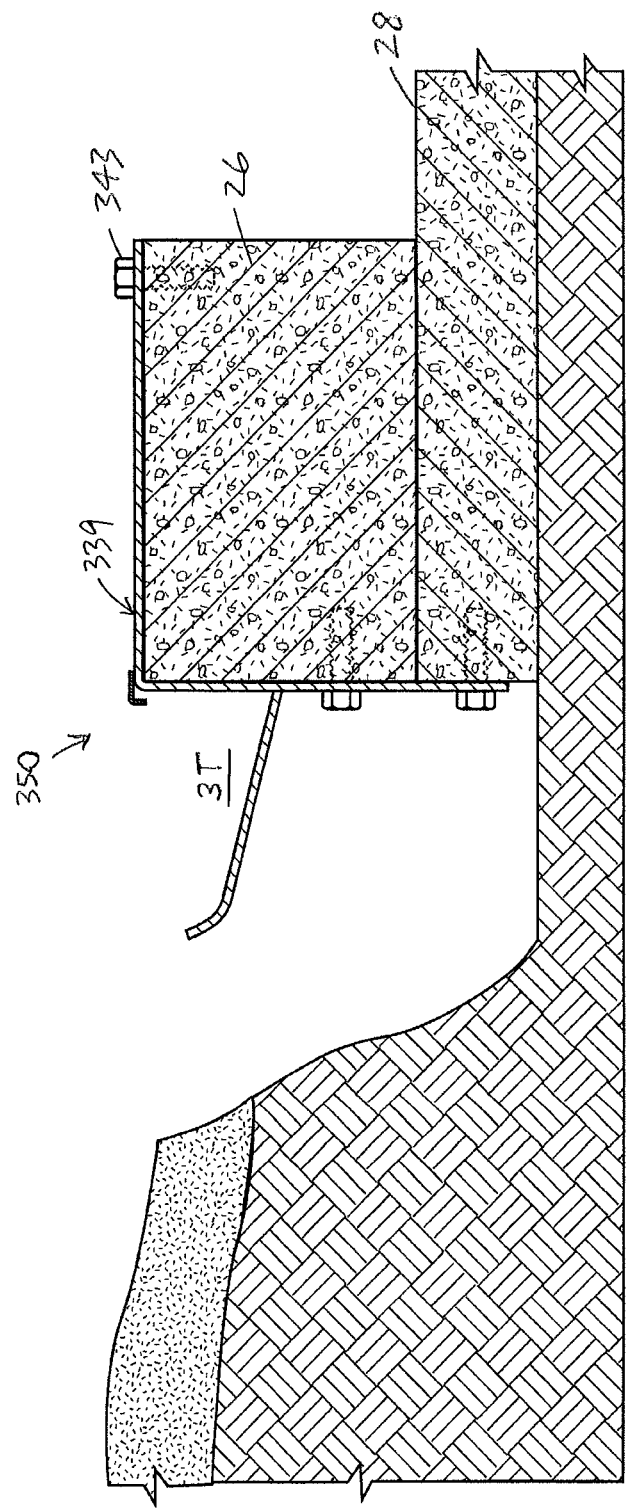
FIG. 6B is a cross-section of a curb of the stall of FIG. 6A with an embodiment of a bracket of the invention mounted thereon, drawn at a larger scale.

As illustrated in FIG. 6A, a part 311 of the sand (shown in dashed outline) has been excavated, as well as part of the base. In one embodiment, the support assembly 350 preferably includes one or more brackets 339 mounted on an exterior surface 341 of the monolithic curb element 26 proximal to a lower end 324 of an enclosure region 321. The bracket 339 defines a slot "3T" therein. It is also preferred that the support assembly 350 includes one or more support bodies 360 secured to the bracket 339 and positioned in the slot "3T". Preferably, the support body 360 at least partially defines a channel 358 in which the part 151 of the transportation element 142 is receivable, for locating the part 151 in the preselected region 346. As can be seen, for example, in FIG. 6B, the bracket 339 preferably is secured to the curb 26 by any suitable fasteners 343.

Figure 6C:
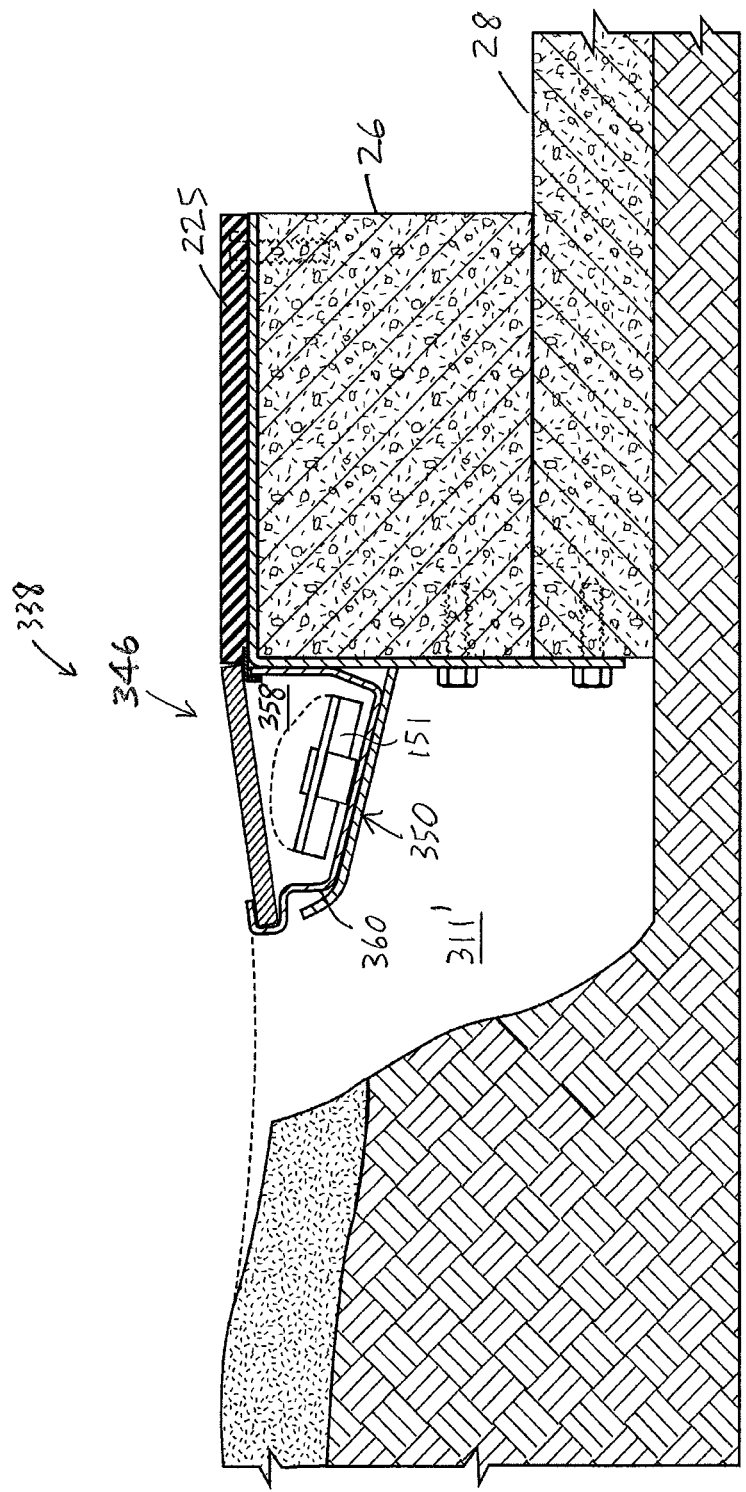
FIG. 6C is a cross-section of the bracket and curb of FIG. 6B in which an embodiment of a support body is secured to the bracket.
Figure 6D:
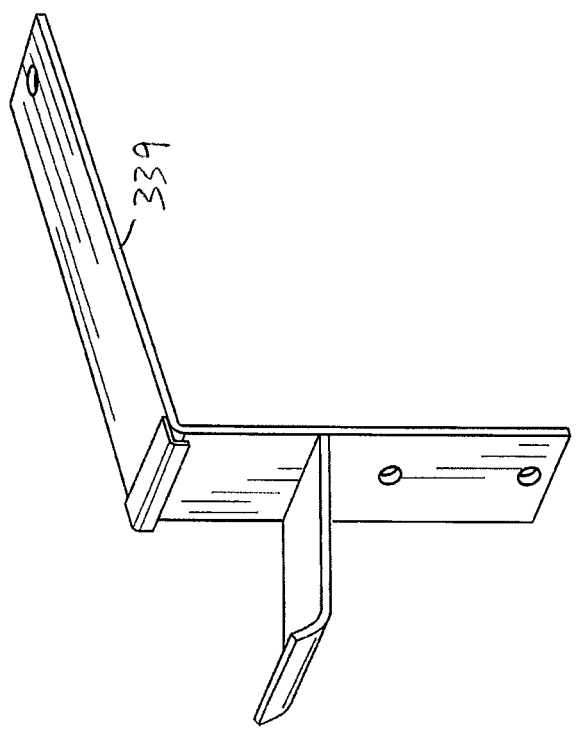
FIG. 6D is an isometric view of the bracket of FIGS. 6B and 6C, drawn at a larger scale.
Figure 6E:
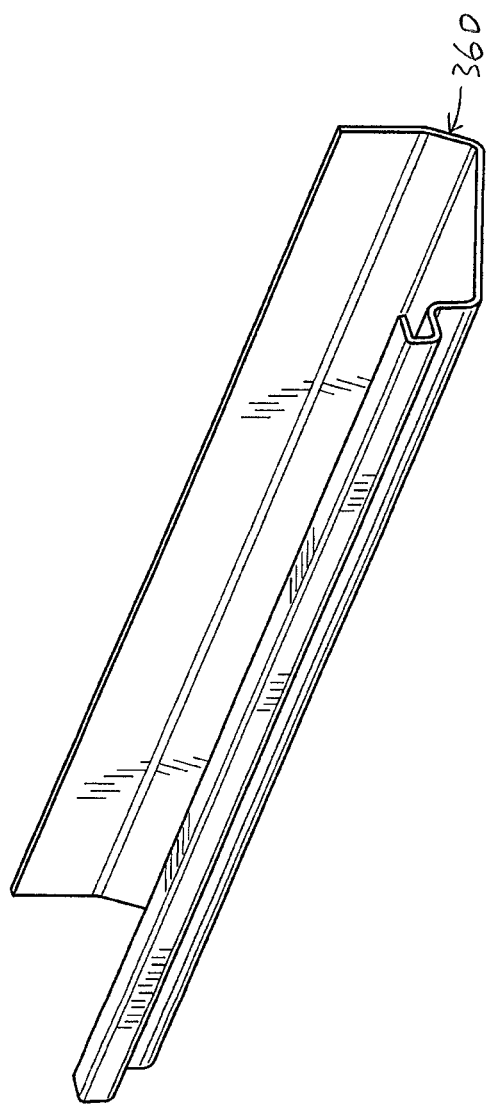
FIG. 6E is an isometric view of the support body of FIG. 6C, drawn at a larger scale.

Once the conveyor system 338 is installed, sand (and base material, if needed) is backfilled, such backfill material being identified by reference numeral 311' in FIG. 6C.

From the foregoing, it can be seen that with the support assembly 350, the conveyor system 338 of the invention is adapted for use with a prior art curb 26. Those skilled in the art would appreciate that the prior art curbs may be provided in a variety of configurations, and the curb 26 illustrated in FIGS. 6A-6C is exemplary only. It will be understood that the bracket 339 preferably is formed in any suitable shape, to engage at least part of the exterior surface of the curb 26.

An alternative embodiment of the conveyor system 438 is illustrated in FIG. 11A. In this embodiment, the transportation element 142 is moved along a predetermined path "2P" that extends between a preselected region 446 and the discharge location "S". The transportation element 142 is driven by the drive subassembly 144 in the direction indicated by the arrows "D". In the embodiment illustrated in FIG. 11A, the discharge location "S" preferably is a stockpile region 445. The portion of the sand preferably is discharged from the loaded links of the transportation element 142 in the stockpile region 445. The discharge of the portion 154' of the sand from the loaded links "L₁" may take place, for example, because a part 418 of the predetermined path "2P" does not include a trough element. Alternatively, the conveyor system 438 may include one or more brushes or similar elements (not shown in FIG. 11A) that are positioned to push the portion 154' of the sand off the loaded links as the loaded links move past such brushes or similar elements.

The sand accumulated in the stockpile region 445 preferably is moved back into the enclosure regions 421 of the stalls 420, 420A, 420B as needed, using any suitable means. For instance, a vehicle (e.g., a trailer) adapted to receive the sand (not shown in FIG. 11A) may be positioned under the part 418 of the predetermined path "2P". As is known, such vehicle may be equipped with means for self-unloading, e.g., such as a conveyor mounted therein. Accordingly, when one of the enclosure regions is to be replenished with sand, the loaded vehicle moves to a position in which the vehicle can move sand therefrom into the target enclosure region. Those skilled in the art would be aware of many other arrangements and means for moving sand from the stockpile to the enclosure regions.

It will be understood that the stockpile region 445 and the drive subassembly may be, for example, in a building separate from the barn in which the stalls are located.

Figure 11B:
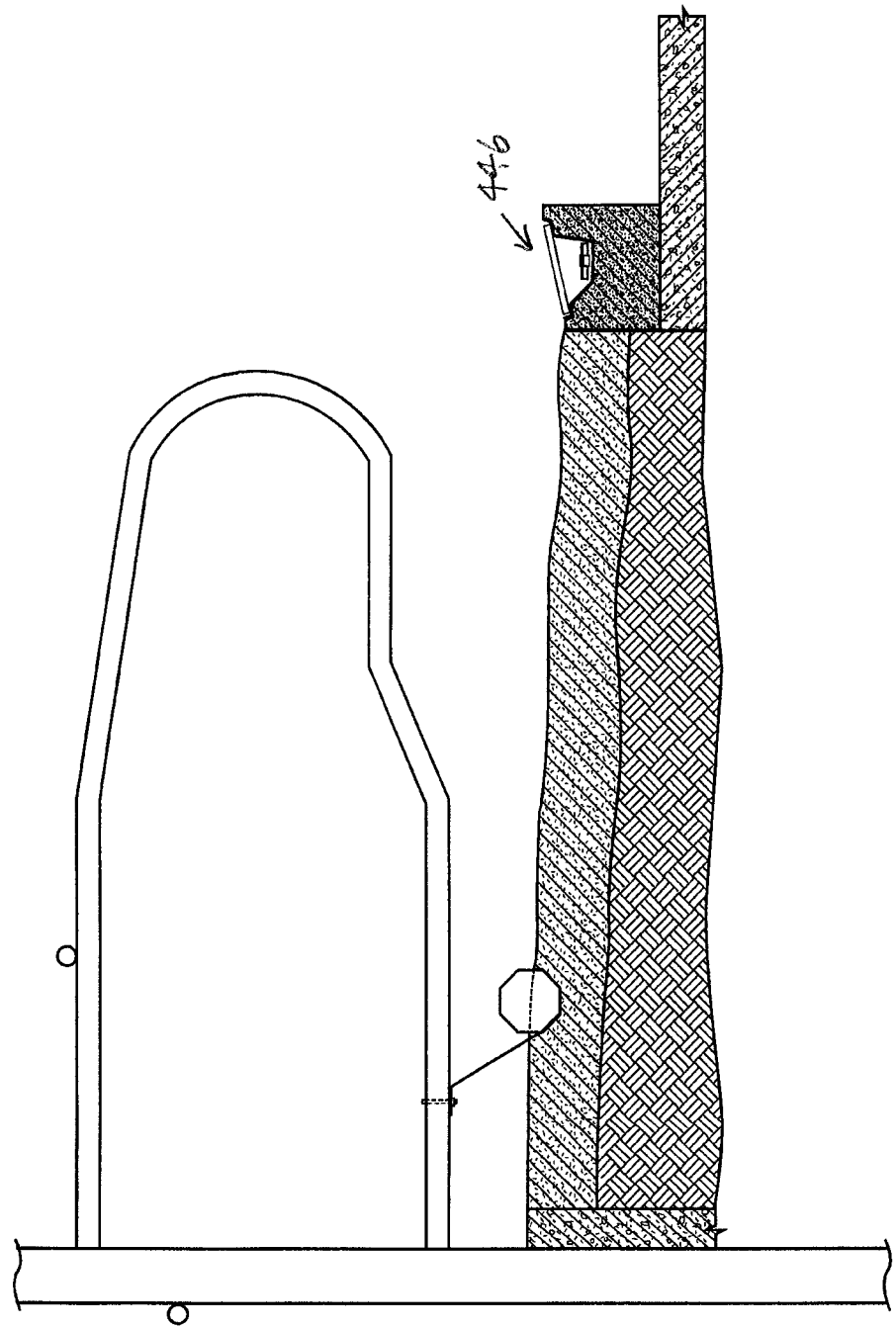
FIG. 11B is a partial cross-section of an alternative embodiment of the stall of the invention, drawn at a larger scale.
Figure 11C:
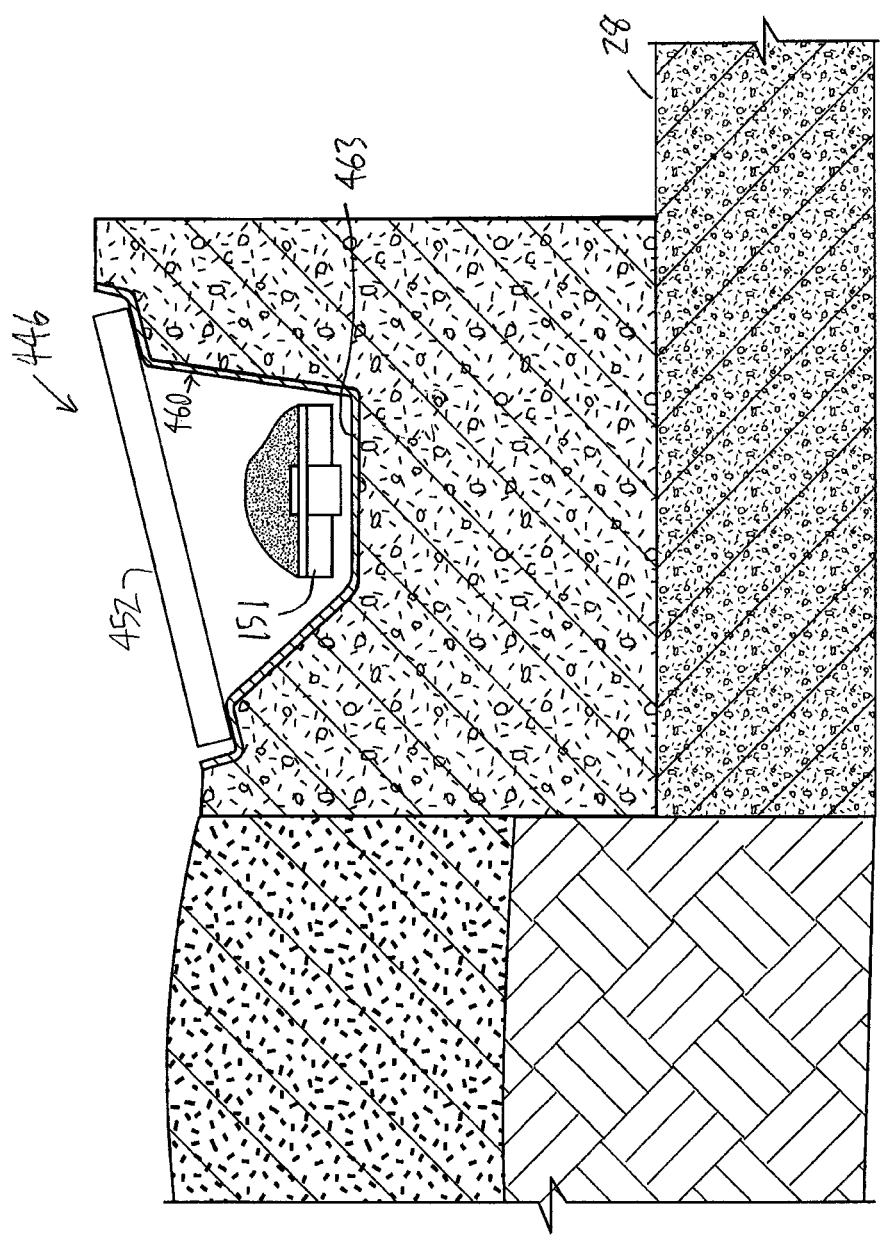
FIG. 11C is a cross-section of a portion of the stall of FIG. 11B, drawn at a larger scale.

Preferably, the transportation element 142 is at least partially guided along the predetermined path "2P" by pulleys 486A-486D. In one embodiment, it is preferred that the part 151 of the transportation element 142 is positioned substantially horizontally (FIGS. 11B, 11C). Accordingly, the pulleys 486A-486D preferably are positioned in substantially the same horizontal plane as the part 151 of the transportation element 142. It will also be understood that the conveyor system 438 includes the balance of the guide subassemblies (not shown) in which the pulleys 486A-486D are mounted, such guide subassemblies 448 being substantially the same as those illustrated in FIGS. 9A-9D, except that the pulleys 486A-486D are mounted for rotation in a horizontal plane. The conveyor system 438 preferably also includes a grate 452 (FIG. 11C). FIG. 11B is a partial cross-section taken along line B-B in FIG. 11A.

As can be seen in FIG. 11A, the conveyor system 438 preferably includes trough elements 404A-404F. It will be understood that the trough elements illustrated in FIG. 11A all have the cross-section illustrated in FIG. 7D, because the part of the transportation element 142 positioned in the preselected region preferably is located substantially horizontally. Accordingly, the floors of each of the trough elements 404B and 404C are substantially aligned with a bottom part 463 of a support body 460. The floors of each of the other trough elements (404A, 404D, 404E, and 404F) preferably are all at substantially the same elevation.

Figure 8E:
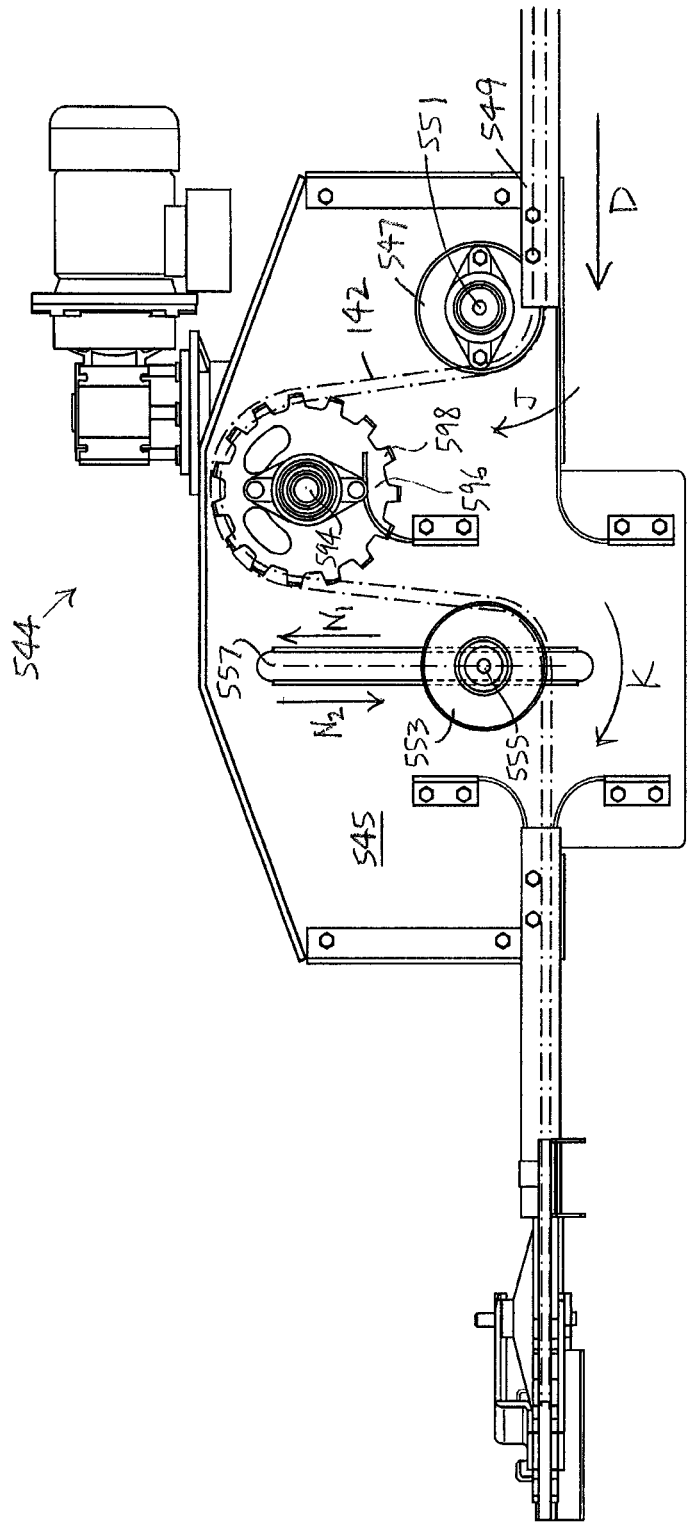
FIG. 8E is a side view of an alternative embodiment of a drive subassembly of the invention, drawn at a smaller scale.

An alternative embodiment of a drive subassembly 544 is illustrated in FIG. 8E. As can be seen in FIG. 8E, the transportation element 142 is moved by the drive subassembly 544 in the direction indicated by arrow "D". Preferably, the drive subassembly 544 includes a body 545, as well as a first idler 547 rotatably mounted in the body 545 proximal to an intake opening 549 of the body 545. The first idler 547 is mounted for rotation about the first idler shaft 551, in the direction indicated by arrow "J".

The drive subassembly 544 preferably also includes a motor subassembly 590 having a shaft 594 on which a gear 596 having teeth 598 is mounted. As illustrated in FIG. 8E, the gear 596 is driven to rotate counter-clockwise. In addition, the drive subassembly 544 preferably includes a second idler 553 mounted for rotation about an axle 555 that is movable in a slot 557 relative to the body 545. It is preferred that the second idler 553 is rotatable about the axle 555 in the direction indicated by arrow "K" in FIG. 8E. Also, the axle 555 preferably is movable in the slot 557 in the directions indicated by arrows "N₁" and "N₂".

The links of the transportation element 142 enter through the intake opening 549 and engage the first idler 547. As can be seen in FIG. 8E, the links preferably engage a number of the teeth 598 as the links are moved around a portion of the gear 596. The links are pulled past the second idler 553 and engage it, urging it upwardly, by upward movement of the axle in the slot. The links exit via an exit opening 559.

The drive subassembly 544 has been found to be advantageous because the stress imposed on the links and the teeth is somewhat reduced, as compared to the stress imposed when the drive subassembly 144 is used. Those skilled in the art would appreciate that the reduced load on the teeth and the individual links, when engaged with the teeth, results in longer chain (transportation element) life and less wear on the teeth.

From the foregoing, it can be seen that an embodiment of a stall system 665 of the invention (FIG. 2) preferably includes the enclosure region 121 extending between the upper end 122 and the lower end 124 thereof, the upper end being elevated above the lower end, and the sand 30 located in the enclosure region 121 on which an animal is positionable. The stall system 665 preferably also includes the conveyor system 138 for moving the portion 154 of the sand 30 that is moved outwardly, from the lower end 124 toward the gutter 28, to the discharge location "S". As described above, the conveyor system 138 preferably includes the transportation element 142 for moving the sand, the drive subassembly 144 for moving the transportation element on the predetermined path "P", and one or more guide subassemblies 148, for guiding the transportation element 142 along one or more portions "$P_1$" of the predetermined path "P" when the transportation element 142 is moved by the drive subassembly 144. It is also preferred that the stall system 665 includes one or more support assemblies 150 for at least partially defining the slot "T" in the preselected region in which the part of the transportation element 142 is receivable, for receiving the portion 154 of the sand. The stall system 665 preferably also includes the grate 152 located at least partially above the part of the transportation element positioned in the preselected region by the support assembly. The grate 152 is adapted to permit the portion of the sand moved outwardly from the lower end of the enclosure region to pass through the grate onto the part of the transportation element thereunder, for movement of said portion thereby to the discharge location, where the portion of the sand is dischargable from the transportation element into said at least one animal stall.

In one embodiment, the invention preferably also includes a kit of parts for the conveyor system 338 that may be retrofitted into a facility with one or more pre-existing curbs. The kit preferably includes a conveyor assembly 140, one or more support assemblies 150, and one or more grates 152. It is also preferred that the support assembly 150 includes one or more brackets 339 mountable on one or more exterior surfaces 341 of the monolithic curb element proximal to the lower end of the enclosure region, and one or more support bodies 160 securable to the bracket 339, as described above. Those skilled in the art would appreciate that the kit of parts may be used with the existing monolithic curb to provide the conveyor system 338.

INDUSTRIAL APPLICABILITY

In use, when the motor 192 is energized, the transportation element 142 is moved by the drive subassembly 144 in the direction indicated by arrow "D" along the predetermined path, to move the portion of the sand from the preselected region to the discharge location "S". As described above, the discharge location "S" may be at the upper end of the enclosure region. Alternatively, the discharge location "S" may be in another location, at a distance from the enclosure region(s).

In FIG. 12, steps of an embodiment of a method 767 of transporting sand are schematically illustrated. The method 767 preferably includes the steps of, first, providing the conveyor assembly 140 (FIG. 12, step 769). As is also described above, the conveyor assembly 140 preferably includes the transportation element 142 and the drive subassembly 144, for moving the transportation element along the predetermined path. One or more support assemblies 150 are also provided (step 771). As is also described above, the support assembly 150 preferably at least partially defines the slot "T" in which the part 151 of the transportation element 142 is receivable. One or more grates 152 are provided and located on the support assemblies (step 773). The grate 152 preferably is adapted to permit the portion 154 of the sand therethrough, onto the part 151 of the transportation element 142. The drive subassembly 144 is energized, to move the transportation element 142 along the predetermined path (step 775). The portion of the sand positioned on loaded links of the transportation element in the preselected region is discharged at the discharge location (step 777).

Figure 13:
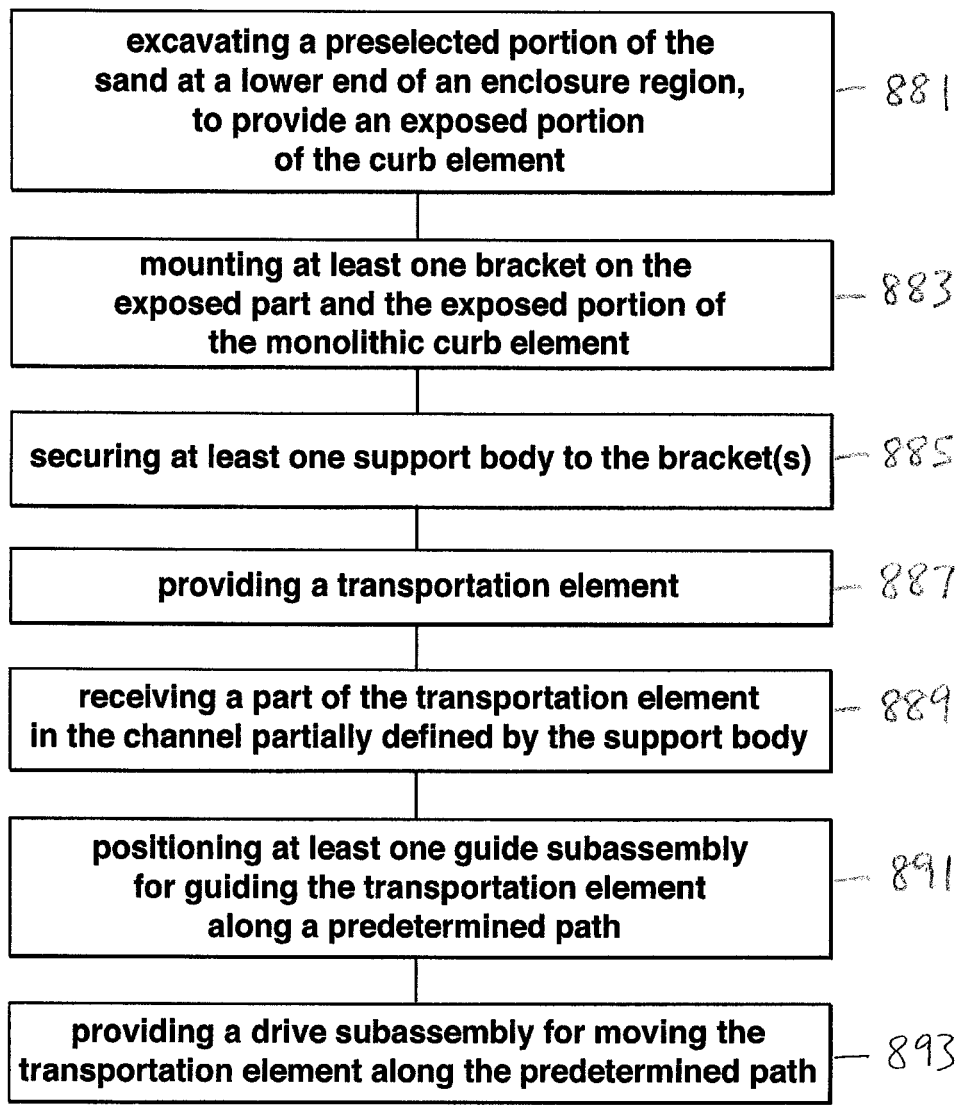
FIG. 13 is a flow chart schematically illustrating another embodiment of a method of the invention.

An embodiment of an alternative method 879 of the invention is schematically illustrated in FIG. 13. The method 879 is a method of mounting the conveyor system 338, i.e., retrofitting with the existing curb 26. First, a preselected portion of the sand at the lower end 122 is excavated, to provide an exposed portion 361 of the curb element (FIG. 13, step 881). It will be understood that part of the base 32 may also have to be excavated (FIG. 6A). As can be seen in FIG. 6A, the exposed portion 361 and an exposed part 302 form the exterior surface 341 of the curb 26. One or more brackets 339 preferably are mounted on the exposed part 302 and the exposed portion 361 of the monolithic curb element 26 (step 883). The bracket defines the slot "T". One or more support bodies 360 preferably are secured to the bracket(s) 339 and positioned in the slot "T", the support body at least partially defining a channel 158 (step 885). The transportation element 142 is also provided (step 887). The part 151 of the transportation element 142 preferably is received in the channel 158 (step 889). It is also preferred that the guide subassemblies 148 are positioned for guiding the transportation element along the predetermined path "P" (step 891). The drive subassembly 144 is provided, for moving the transportation element 142 on the predetermined path (step 893).

It would be appreciated by those skilled in the art that certain steps may not necessarily be performed in the order illustrated in FIGS. 12 and 13. For example, in FIG. 12, steps 769, 771, and 773 may be performed in any order. Also, in FIG. 13, the order of step 891 may, alternatively, be performed before step 889.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A conveyor system for transporting sand that is moved outwardly, from a lower end of an enclosure region in at least one animal stall toward a gutter, to a discharge location, the conveyor system comprising:
a conveyor assembly comprising:
a transportation element for moving the sand;
a drive subassembly for moving the transportation element on a predetermined path between a preselected region that is located between the lower end and the gutter, and the discharge location;
at least one guide subassembly, for guiding the transportation element along at least one portion of the predetermined path when the transportation element is moved by the drive subassembly;
at least one support assembly for at least partially defining a slot in the preselected region in which a part of the transportation element is receivable, for receiving at least a portion of the sand moved outwardly from the lower end of the enclosure region;
at least one grate located at least partially above the part of the transportation element positioned in the preselected region by said at least one support assembly; and
said at least one grate being adapted to permit the portion of the sand moved outwardly from the lower end of the enclosure region to pass through said at least one grate onto the part of the transportation element thereunder, for movement of said portion thereby to the discharge location, where the portion of the sand is dischargable from the transportation element at the discharge location.

2. A conveyor system according to claim 1 in which said at least one support assembly comprises:
   a curb comprising the slot therein;
   at least one support body positioned in the slot, said at least one support body at least partially defining a channel in which the part of the transportation element is receivable.

3. A conveyor system according to claim 2 in which the curb comprises a flattened region positioned proximal to the gutter, for permitting movement of an animal between said at least one animal stall and the gutter.

4. A conveyor system according to claim 2 in which said at least one support body additionally comprises a lip element for at least partially retaining said at least one grate above the part of the transportation element positioned in the preselected region.

5. A conveyor system according to claim 2 in which:
   said at least one grate comprises an inner side positioned proximal to the lower end of the enclosure region and an outer side positioned outwardly relative to the inner side, when said at least one grate is supported by said at least one support body.

6. A conveyor system according to claim 5 in which said at least one grate is positioned by the curb and said at least one support body at a preselected grate angle relative to the horizontal, with the outer side of said at least one grate raised relative to the inner side of said at least one grate, to locate said at least one grate to receive the sand moved outwardly from the stall by an animal positioned therein.

7. A conveyor system according to claim 6 in which the preselected grate angle is approximately 11.5°.

8. A conveyor system according to claim 6 in which:
   the curb additionally comprises an outer part extending between the slot and the gutter; and
   the system additionally comprises a substantially resilient mat positioned on the outer part of the curb, for resiliently supporting the animal.

9. A conveyor system according to claim 8 in which:
   the outer part comprises a substantially planar upper surface;
   the mat has a thickness at least partially defined by a bottom surface thereof positioned on the outer part's upper surface and a top surface thereof, the thickness being sufficient to locate the top surface of the mat substantially horizontally aligned with an upper region of the outer side of said at least one grate.

10. A conveyor system according to claim 1 in which:
    said at least one guide subassembly comprises:
    a frame;
    a pulley comprising a V-shaped groove thereon in which a side of the transportation element is at least partially receivable, for engagement with the transportation element in the V-shaped groove, to guide the transportation element along at least the portion of the predetermined path; and
    a pulley bracket for locating the pulley in relation to the frame to permit the transportation element to pass between the pulley and the frame while the transportation element is engaged by the pulley.

11. A conveyor system according to claim 10 in which said at least one guide subassembly comprises at least one wear plate mounted on the frame, for resisting wear due to sliding engagement of the transportation element with said at least one wear plate, when the transportation element is at least partially engaged with the pulley.

12. A conveyor system according to claim 1 in which the drive subassembly comprises:
    at least one motor subassembly comprising:
        a motor;
        a shaft rotatable by the motor;
        a gear mounted on the shaft, the gear comprising a plurality of teeth for engaging the transportation element, to move the transportation element along the predetermined path; and
    a split shoe subassembly for supporting the transportation element, the split shoe subassembly comprising:
        an upstream portion;
        a downstream portion; and
        the upstream and downstream portions being separated by a gap to permit sand on the transportation element to pass through the gap under the influence of gravity upon engagement of the gear with the transportation element.

13. A conveyor system according to claim 1 in which said at least one support assembly comprises:
    at least one bracket mounted on an exterior surface of a monolithic curb element proximal to the lower end of the enclosure region, to define the slot therein;
    at least one support body secured to said at least one bracket and positioned in the slot, said at least one support body at least partially defining a channel in which the part of the transportation element is receivable to locate the part of the transportation element in the preselected region.

14. A conveyor system according to claim 1 in which:
    the part of the transportation element in the preselected region comprises an inward side proximal to the lower end of the enclosure region and an opposite outward side; and
    the part of the transportation element is positioned with the outward side lower than the inward side, to define a preselected transportation element angle relative to the horizontal.

15. A conveyor system according to claim 14 in which the preselected transportation element angle is approximately 15°.

16. A conveyor system for transporting sand that is moved outwardly, from a lower end of an enclosure region in at least one animal stall toward a gutter, to an upper end of the enclosure region, the conveyor system comprising:
    a conveyor assembly comprising:
        a transportation element for moving the sand;
        a drive subassembly for moving the transportation element on a predetermined path between a preselected region that is located between the lower end and the gutter, and the upper end;
        at least one guide subassembly, for guiding the transportation element along at least one portion of the predetermined path when the transportation element is moved by the drive subassembly;
    at least one support assembly for at least partially defining a slot in the preselected region in which a part of the transportation element is receivable, for receiving at least a portion of the sand moved outwardly from the lower end of the enclosure region;
    at least one grate located at least partially above the part of the transportation element positioned in the preselected region by said at least one support assembly;
    said at least one grate being adapted to permit the portion of the sand moved outwardly from the lower end of the enclosure region to pass through said at least one grate onto the part of the transportation element thereunder, for movement of said portion thereby to the upper end, where the portion of the sand is dischargable from the transportation element; and an upper housing positioned proximal to the upper end of the enclosure region, in which a segment of the transportation element is receivable and from which the portion of the sand is discharged.

17. A conveyor system according to claim 16 in which the upper housing comprises a plurality of apertures through which the portion of the sand transported on the transportation element falls onto the upper end of the enclosure region.

18. A conveyor system according to claim 17 in which the segment of the transportation element received in the upper housing is positioned substantially horizontally.

19. A stall system for at least one animal located proximal to a gutter, the stall system comprising:

an enclosure region extending between an upper end and a lower end thereof, the upper end being elevated above the lower end;

sand located in the enclosure region on which said at least one animal is positionable;

a conveyor assembly for moving a portion of the sand that is moved outwardly, from the lower end toward the gutter, to a discharge location, the conveyor assembly comprising:

a transportation element for moving the sand;

a drive subassembly for moving the transportation element on a predetermined path between a preselected region that is located between the lower end and the gutter, and the discharge location;

at least one guide subassembly, for guiding the transportation element along at least one portion of the predetermined path when the transportation element is moved by the drive subassembly;

at least one support assembly for at least partially defining a slot in the preselected region in which a part of the transportation element is receivable for receiving at least a portion of the sand moved outwardly from the lower end of the enclosure region;

a grate located at least partially above the part of the transportation element positioned in the preselected region by said at least one support assembly; and the grate being adapted to permit the portion of the sand moved outwardly from the lower end of the enclosure region to pass through the grate onto the part of the transportation element thereunder, for movement of said portion thereby to the discharge location, where the portion of the sand is dischargable from the transportation element at the discharge location.

20. A method of transporting sand that is moved outwardly, from a lower end of an enclosure region in at least one animal stall toward a gutter, to a discharge location, the method comprising the steps of (a) providing a conveyor assembly comprising:

a transportation element for moving the sand;

a drive subassembly for moving the transportation element on a predetermined path between a preselected region that is located between the lower end and the gutter, and the discharge location;

at least one guide subassembly, for guiding the transportation element along at least one portion of the predetermined path when the transportation element is moved by the drive subassembly;

(b) providing at least one support assembly for at least partially defining a slot in the preselected region in which a part of the transportation element is receivable, for receiving at least a portion of the sand moved outwardly from the lower end of the enclosure region;

(c) providing at least one grate located at least partially above the part of the transportation element positioned in the preselected region by said at least one support assembly, said at least one gate permitting the portion of the sand to pass therethrough to the part of the transportation element;

(d) energizing the drive subassembly, to move the transportation element along the predetermined path; and (e) allowing the portion of the sand positioned on the transportation element in the preselected region to be discharged in the discharge location.

21. A kit of parts for a conveyor system for transporting sand that is moved outwardly, from a lower end of an enclosure region in at least one animal stall toward a gutter, to a discharge location, said at least one animal stall comprising a monolithic curb element located proximal to the lower end, the kit comprising:

a conveyor assembly comprising:

a transportation element for moving the sand;

a drive subassembly for moving the transportation element on a predetermined path between a preselected region that is located between the lower end and the gutter, and the discharge location;

at least one guide subassembly, for guiding the transportation element along at least one portion of the predetermined path when the transportation element is moved by the drive subassembly;

at least one support assembly for at least partially defining a slot in the preselected region in which a part of the transportation element is receivable, for receiving at least a portion of the sand moved outwardly from the lower end of the enclosure region;

at least one grate to be located at least partially above the part of the transportation element positioned in the preselected region by said at least one support assembly; and said at least one grate being adapted to permit the portion of the sand moved outwardly from the lower end of the enclosure region to pass through said at least one grate onto the part of the transportation element thereunder, for movement of said portion thereby to the discharge location, where the portion of the sand is dischargable from the transportation element;

said at least one support assembly comprising:

at least one bracket mountable on at least one exterior surface of a monolithic curb element proximal to the lower end of the enclosure region, said at least one bracket defining the slot; and at least one support body securable to said at least one bracket and positioned in the slot, for at least partially defining the channel in which the part of the transportation element is receivable and located thereby in the preselected region.

22. A method of mounting a conveyor system for transporting sand that is moved outwardly, from a lower end of an enclosure region in at least one animal stall toward a gutter, to a discharge location, said at least one animal stall comprising at least one monolithic curb element having a pre-existing substantially exposed part, the method comprising the steps of:

(a) excavating a preselected portion of the sand at the lower end, to provide an exposed portion of the curb element;

(b) mounting at least one bracket on the exposed part and the exposed portion of said at least one monolithic curb element, said at least one bracket defining a slot therein;

(c) securing at least one support body to said at least one bracket, said at least one support body being positioned in the slot and at least partially defining a channel in a preselected region between the lower end and the gutter;
(d) providing a transportation element;
(e) positioning a part of the transportation element in the channel;
(f) positioning at least one grate on said at least one support body;
(g) positioning at least one guide subassembly for guiding the transportation element along a predetermined path between the preselected region and the discharge location; and
(h) providing a drive subassembly for moving the transportation element on the predetermined path.

* * * * *